(12) United States Patent
Khandekar et al.

(10) Patent No.: US 8,737,229 B2
(45) Date of Patent: May 27, 2014

(54) ACCESS MECHANISMS FOR BASE STATIONS IN HETEROGENEOUS ACCESS POINT NETWORKS

(75) Inventors: Aamod D. Khandekar, San Diego, CA (US); Avneesh Agrawal, San Diego, CA (US); Mohammad J. Borran, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 12/498,593

(22) Filed: Jul. 7, 2009

(65) Prior Publication Data

US 2010/0008230 A1 Jan. 14, 2010

Related U.S. Application Data

(60) Provisional application No. 61/080,045, filed on Jul. 11, 2008.

(51) Int. Cl.
*G01R 31/08* (2006.01)

(52) U.S. Cl.
USPC ............................ 370/237; 370/311; 370/329

(58) Field of Classification Search
USPC ........................... 370/237, 254, 341; 455/444
See application file for complete search history.

(56) References Cited

U.S. PATENT DOCUMENTS

| 6,023,622 | A | 2/2000 | Plaschke et al. |
| 7,042,856 | B2 | 5/2006 | Walton et al. |
| 2005/0239413 | A1 | 10/2005 | Wiberg et al. |
| 2006/0056373 | A1 * | 3/2006 | Legg ............................ 370/341 |
| 2006/0126536 | A1 * | 6/2006 | Patel et al. ..................... 370/254 |
| 2007/0060057 | A1 | 3/2007 | Matsuo et al. |
| 2007/0280096 | A1 | 12/2007 | Yanover et al. |
| 2008/0002643 | A1 | 1/2008 | Octaviano et al. |
| 2008/0008147 | A1 | 1/2008 | Nakayama |
| 2008/0043610 | A1 | 2/2008 | Li et al. |
| 2008/0090575 | A1 * | 4/2008 | Barak et al. ................... 455/444 |
| 2009/0232080 | A1 * | 9/2009 | Ahn et al. ..................... 370/329 |

FOREIGN PATENT DOCUMENTS

| EP | 0802692 A2 | 10/1997 |
| EP | 0898437 A2 | 2/1999 |
| EP | 1806942 A1 | 7/2007 |
| WO | WO2007073250 A1 | 6/2007 |

OTHER PUBLICATIONS

International Search Report and Written Opinion—PCT/US2009/050301—ISA/EPO—Mar. 3, 2010.
Feng M. et al., 'Uplink Adaptive Resource Allocation Mitigating Inter-Cell Interference Fluctuation for Future Cellular Systems', Communications, ICC '07. IEEE International Conference (Jun. 2007).
Taiwan Search Report—TW098123480—TIPO—Aug. 10, 2012.

\* cited by examiner

*Primary Examiner* — David Oveissi
(74) *Attorney, Agent, or Firm* — Dalei Dong

(57) ABSTRACT

Providing for improved access communication for wireless systems is described herein. By way of example, wireless devices can employ wireless resource re-use in selecting a subset of access communication resources, to mitigate interference on uplink access requests. Re-use can be based on current network conditions, or on a type of base station facilitating the wireless communication. In some aspects, planned resource re-use can be facilitated by an access terminal. The access terminal requests neighboring or interfering network access points to reserve a set of resources for a serving access point. Reserved resources can be conveyed to the serving access point with an uplink access probe, to further mitigate interference.

45 Claims, 15 Drawing Sheets

ACCESS MECHANISMS FOR BASE STATIONS IN HETEROGENEOUS ACCESS POINT NETWORKS

CLAIM OF PRIORITY UNDER 35 U.S.C §119

The present Application for Patent claims priority to U.S. Provisional Application No. 61/080,045 entitled ACCESS MECHANISMS FOR LOW POWER BASE STATIONS IN HETEROGENEOUS NETWORKS filed Jul. 11, 2008, assigned to the assignee hereof and expressly incorporated by reference herein.

BACKGROUND

I. Field

The following relates generally to wireless communication, and more specifically to allocation of wireless resources to access communications to facilitate improved access for semi-planned or unplanned wireless networks.

II. Background

Wireless communication systems are widely deployed to provide various types of communication content such as, e.g. voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

Wireless messages are typically sub-divided in time, frequency, according to codes, and so on, to coordinate communication between access point and access terminal, and to reduce interference between multiple concurrent transmissions. For instance, in an orthogonal frequency division multiple access (OFDMA) system, forward link messages are segmented into time and frequency subdivisions. As one example, a signal can be considered two-dimensional comprising time and frequency, and segmented into multiple frequency sub-bands, and multiple time sub-frames. Each time-frequency sub-division is considered a resource of the OFDMA wireless signal. Furthermore, sets of resources can be configured to carry particular data. For instance, in each time sub-frame, frequency sub-bands at the edge of a spectrum bandwidth can be blanked to reduce cross-talk (guard bands), one set of sub-bands can be reserved for acquisition and control information, another set can be reserved for traffic data, and so on. By analyzing particular frequencies, a device receiving the signal can extract the acquisition and control information from the signal, ignore irrelevant user traffic, and the like.

Further to the above, control and acquisition information is typically set apart (e.g., in time or frequency) from a traffic-related portion of a wireless signal. As an example, pilot signals carrying network acquisition data are often transmitted on multiple frequency channels, distributed throughout a frequency spectrum employed for the wireless signal. In some systems, pilot signals can also be transmitted at higher amplitude than traffic signals, or even other control signals. This arrangement can yield improved distinction of application-related information and acquisition information at a receiver.

Upon identifying a pilot signal, a receiving device typically analyzes the signal to identify a source of the signal. For instance, a transmitting base station typically includes a distinct identifier or code into its pilot signals. The identifier can be used to distinguish the base station from other access points, as well as identify a network associated with the access point. In some cases, a pilot signal might also specify default uplink resources for transmitting an acquisition probe to the base station. In general though, once a pilot signal is obtained, a receiving device can determine whether and how to proceed in communicating with the transmitting base station.

Recent advancements in wireless communications have seen various types of base stations deployed within a common area, resulting in a heterogeneous access point network. Although such networks can be useful to provide different kinds of wireless communication for different subscribers, additional complexities can result. For instance, typical interference reduction techniques that work well for planned, homogeneous base station deployments may not be as effective in unplanned or heterogeneous access point networks. Accordingly, current development efforts in wireless communications involve signal access and acquisition techniques for restricted access base stations, low and medium power base stations, unplanned deployments, and various combinations thereof.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for improved access communication for wireless systems. According to some aspects of the subject disclosure, specific wireless resources can be designated for a set of base stations in a wireless communication environment. Other base stations can blank or transmit with reduced power on resources reserved for another set of base stations. In at least one aspect, the set of base stations can be categorized as a function of base station type, such as base station transmit power, base station service area, or base station access type (e.g., restricted, general). Accordingly, sets of base stations can expect mitigated interference at least from different categories of base stations.

According to other aspects of the subject disclosure, access resources can be designated to one or more base stations based on network load or prevailing interference conditions. Thus, when load or interference is high, a resource re-use scheme can be employed that aggressively mitigates interference. Conversely, when load or interference is light, a less aggressive re-use scheme, or non-re-use scheme can be employed to lower processing requirements of wireless devices. In at least one aspect of the subject disclosure, devices can monitor network load or interference conditions over time and update interference mitigation schemes periodically to compensate for dynamic load or interference conditions.

According to particular aspects of the subject disclosure, provided is a method of facilitating access to a wireless communication environment comprising diverse types of wireless access points. The method can comprise employing a processor to parse a set of wireless resources dedicated for access communication and employ a re-use algorithm to generate a subset of the wireless resources reserved at least for a particular network access point. Moreover, the method can comprise outputting the generated subset to a wireless transmitter for broadcast transmission to facilitate terminal access to the particular network access point.

According to further aspects, provided is an apparatus that facilitates communication with a network. The apparatus can comprise memory that includes stored protocols that identify wireless signal resources for network access communication involving the apparatus. In addition, the apparatus can comprise a wireless transmitter for broadcasting a subset of wireless resources employed for access communication with the apparatus. Moreover, the apparatus can comprise a data processor that executes a re-use module that establishes a re-use scheme for access resource selection based at least on network load or interference conditions and a selection module that employs the re-use scheme to generate the subset of wireless resources from a set of network access resources.

In other aspects, disclosed is an apparatus for wireless communication. The apparatus can comprise means for employing a processor to obtain a set of wireless resources employed for access communication with a particular network access point. Additionally, the apparatus can comprise means for employing the processor to modify the set of wireless resources based on changes in network load or interference conditions. Furthermore, the apparatus can comprise means for employing a wireless transmitter to broadcast the set of wireless resources to facilitate terminal access to the particular network access point.

According to one or more other aspects, the subject disclosure provides at least one processor configured for wireless communication. The processor(s) can comprise a first module that parses a set of wireless resources dedicated for access communication. Additionally, the processor(s) can comprise a second module that employs a re-use algorithm to generate a subset of the wireless resources reserved at least for a particular network access point. Moreover, the processor(s) can comprise a third module that outputs the generated subset for broadcast transmission to facilitate terminal access to the particular network access point.

In still other aspects, the subject disclosure provides a computer program product comprising a computer-readable medium. The computer-readable medium can comprise a set of codes for causing a computer to parse a set of wireless resources dedicated for access communication. Further, the computer-readable medium can comprise an additional set of codes for causing the computer to employ a re-use algorithm to generate a subset of the wireless resources reserved at least for a particular network access point. The computer-readable medium can comprise a further set of codes for causing the computer to output the generated subset for broadcast transmission to facilitate terminal access to the particular network access point.

Further to the above, the subject disclosure provides a method of accessing a wireless network. The method can comprise employing a wireless receiver to obtain a set of wireless signal access resources employed by a wireless network access point. Additionally, the method can comprise employing a data processor to select a subset of the wireless signal access resources for transmission of an access probe to the wireless network, wherein the access probe comprises DL resources reserved by a neighboring or interfering access point. Furthermore, the method can comprise employing a wireless transmitter to deliver the access probe to the wireless network access point.

According to other aspects, disclosed is an apparatus for wireless communication. The apparatus can comprise a wireless transceiver for sending and receiving wireless signals and memory that stores network protocols for identifying access channels employed by network access points. Furthermore, the apparatus can comprise a data processor configured to execute a set of modules. The set of modules includes a preference module that monitors received DL signals and identifies a preferred network access point from the signals, an access module that employs the stored protocols to obtain access communication resources specified for the preferred network access point and a signaling module that generates an access probe to be transmitted by the wireless transceiver over the specified resources.

In still other aspects, disclosed is an apparatus for accessing a wireless network. The apparatus can comprise means for employing a wireless receiver to obtain a set of wireless signal access resources employed by a wireless network access point. Furthermore, the apparatus can comprise means for employing a data processor to negotiate with a neighboring or interfering access point for reserved resources for access communication involving the wireless network access point. Further to the above, the apparatus can comprise means for employing a wireless transmitter to deliver the access probe and reserved resources to the wireless network access point.

In at least one aspect, the subject disclosure provides at least one processor configured for wireless communication. The processor(s) can comprise a first module that obtains a set of wireless signal access resources employed by a wireless network access point. Further, the processor(s) can comprise a second module that negotiates with a neighboring or interfering access point for reserved resources for access communication involving the wireless network access point and a third module that delivers the access probe and reserved resources to the wireless network access point.

According to still other aspects, the subject disclosure provides a computer program product comprising a computer-readable medium. The computer-readable medium can comprise a set of codes for causing a computer to obtain a set of wireless signal access resources employed by a wireless network access point. The computer-readable medium can also comprise an additional set of codes for causing the computer to negotiate with a neighboring or interfering access point for reserved resources for access communication involving the wireless network access point. Furthermore, the computer-readable medium can comprise another set of codes for causing the computer to deliver the access probe and reserved resources to the wireless network access point.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
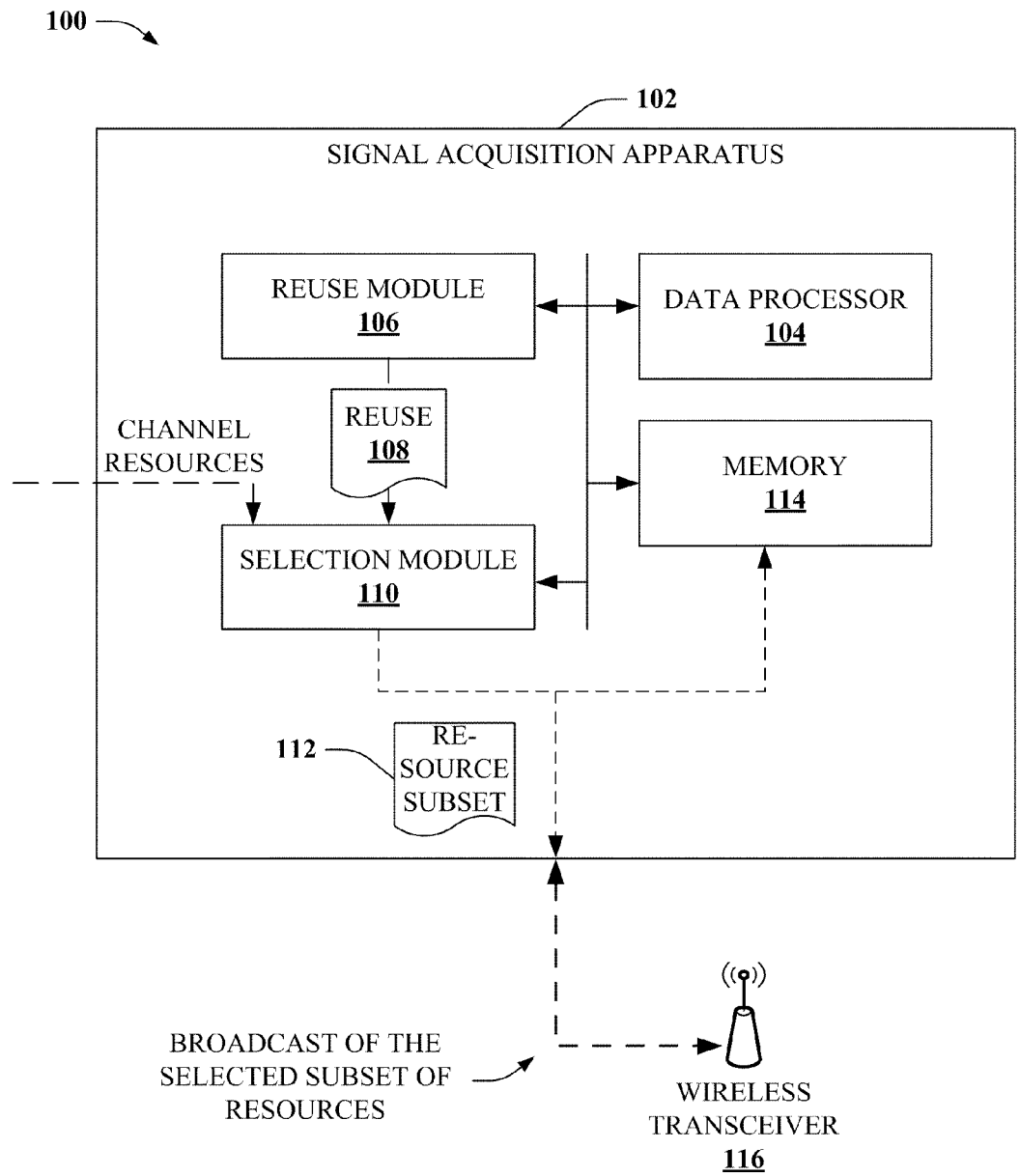
FIG. 1 depicts a block diagram of an example apparatus that facilitates signal acquisition in heterogeneous access point networks according to disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing cell-specific signal coding for reference signals in a wireless communication environment. One skilled in the art should appreciate that similar techniques could apply to other communication environments.

Planned deployments of wireless base stations (BSs) in a wireless access network (AN) typically consider position, spacing and transmission/receive characteristics of transceiver devices. One goal of planned base station deployment is to reduce interference among transmitters. Thus, for instance, one deployment plan might space different base stations apart by a distance approximately equal to their respective maximum transmit ranges. In this type of deployment, signal interference between the base stations is minimized.

In unplanned or semi-planned BS deployments, wireless transmitters are often not positioned to reduce interference. Instead, it is not unusual with semi or unplanned deployments for two or more transmitting BSs (e.g., that transmit into substantially 360 degrees) to be in close proximity. Furthermore, such deployments often include base stations that transmit at significantly different power, covering a wide range of service areas (e.g. also referred to as a heterogeneous transmit power environment). As an example, a high power BS (e.g. macro cell at 20 watts) may be situated proximate a mid or low power transmitter (e.g., micro cell, pico cell, femto cell, etc., of varying transmission power, e.g., 8 watts, 3 watts, 1 watt, and so on). The higher power transmitter can be a significant source of interference for the mid and/or low power transmitters. Furthermore, lower power transmitters can be a significant source of interference for the high power BS, particularly for terminals close to such transmitters. Accordingly, signal interference in semi or un-planned environments and/or heterogeneous transmit power environments can often be a significant problem as compared with the conventional planned macro base station AN.

In addition to the foregoing, restricted access (RA) BSs can compound problems resulting from semi and un-planned BS deployment. For instance, an RA BS can selectively provide access to one or more terminal devices, denying network access to other such devices. Accordingly, devices are forced to search for other BSs if denied access, and often observe significant interference from the denying BS. As utilized herein, an RA BS can also be termed a private BS (e.g. a Femto cell BS or a home Node B [HNB]), or some similar terminology.

Although RA BSs add network complexity, they do provide significant utility. For instance, a personal RA BS can be installed privately in a home, at an office, etc., utilizing private networking resources for voice and or data access (e.g. to the Internet and/or to a mobile operator's network). Such an arrangement can provide great individual control over a subscriber's network access via the personal RA BS. However, because the network interface utilizes a subscriber's private network resources, rather than resources maintained by a network operator, the owner of such a BS might not want those resources utilized by general access mobile users;

accordingly, an RA BS is typically configured to limit access to pre-specified terminal devices, preserving resources for authorized users.

Further to the above, un-planned, heterogeneous and RA deployments can lead to poor geometric conditions for a wireless AN. Even without restricted association, a device that observes a very strong signal from a macro BS could be configured to prefer to connect to a pico BS, because the pico BS is "closer" to the terminal in terms of path-loss. Thus, the pico BS is capable of serving the terminal at a comparable data rate while causing less interference to the wireless AN. However, a terminal monitoring the pico BSs signal (e.g., a preamble comprising control and acquisition information) will observe significant interference from the macro BS, resulting in a low signal to noise ratio (SNR) at the terminal (e.g., possibly rendering the pico BS undetectable by the BS).

Additional problems can also result when an RA BS is introduced into the heterogeneous BS environment, discussed above. In such a case, a terminal device can be very close to a BS to which it is not allowed to connect, observing signals of such BS at very high level. Accordingly, this BS will cause strong interference (and, e.g. resulting in very low SNR) for a BS serving the terminal (e.g., the closest BS the terminal is allowed to connect to), and likewise can cause high interference to terminals served by the RA BS. In some cases, the interference can be so strong as to desensitize an analog/digital (A/D) converter of the terminal. To illustrate the problem of desensitization, components of a terminal can typically be configured based on total received signal strength plus an interference level (which, e.g., can be dominated by the RA BS in the above scenario). Where the signal level of the serving BS is extremely low relative the nearby RA BS, such signal can be below a quantization noise level. In this case, even if the interfering BS is present on different frequency resources of a wireless signal than the serving BS (e.g., a different sub-carrier or set of sub-carriers), the interfering BS can still render the serving BS undetectable at the terminal, the latter being masked by quantization noise.

As described herein, several aspects of the subject disclosure are provided to address the foregoing problems or similar network communication and/or access problems. In one example, orthogonal wireless resources employed for access communications (e.g., an uplink acquisition probe, a downlink acquisition grant or denial, related acquisition communication) can be allocated to particular base stations or different types of base stations based on a re-use scheme. As utilized herein, re-use refers to segmentation of a set of wireless resources into distinct subsets thereof, and allocating different subsets different categories of transmitters (e.g., BSs, or access terminals) or wireless traffic (e.g., access and acquisition traffic, control traffic, voice traffic, data traffic, and so on). Thus, transmitters within a particular category, or transmitting a particular category of traffic, transmit on an assigned set of resources, and either blank or transmit with reduced power on resources assigned to other categories of transmitters or traffic.

As an example, consider an orthogonal frequency division multiple access (OFDMA) system with 100 kilohertz (kHz) frequency band reserved for access communications. To implement re-use for access communications, the 100 kHz band can be further segmented, e.g. into ten orthogonal sub-bands of 10 kHz each, and different categories of devices or traffic assigned to respective sub-bands. As a more specific example for DL transmission, different sub-bands or sets of sub-bands can be allocated to different types of BSs, including access type (e.g., restricted access, general access), transmit power type (e.g. 50 watt, 25 watt, high power, mid power, etc.), or cell type (e.g., macro cell, micro cell, pico cell, femto cell), or the like, or combinations thereof. Thus, in a heterogeneous access point environment comprising macro cells and femto cells, a re-use scheme might assign nine access sub-bands to either type of base station, and reserve a tenth access sub-band just for femto cells. Accordingly, if a femto cell observes high interference from the macro cells, the tenth sub-band can be employed; otherwise the femto cell can employ any of the ten sub-bands. It should be appreciated, however, that the subject disclosure is not limited to the particular allocation of resources cited in the above example (or other specific examples described herein). Rather, other associations between different categories of transmitters, traffic, etc., and different subsets of access resources, known in the art or made known to one of skill in the art by way of the context provided herein, are within the scope of the subject disclosure.

Various forms of resource re-use are presented herein. Examples of different forms of re-use, or re-use schemes, include natural re-use, random re-use (or pseudo-random re-use) and planned re-use. Natural re-use involves a determination of current load and an estimate of interference at a receiver, for a common access channel. Access terminals can select a resource (e.g., time-frequency segment) on the common channel to transmit an access probe. With a relatively small terminal load on the access channel, minimal overlap of selected access resources occurs, creating a natural re-use on the common band.

Further to the above, different types of waveforms, such as OFDMA, single carrier frequency division multiple access (SC-FDMA), time-division or frequency-division code division multiple access (CDMA), etc., can be utilized on the common access channel. For instance, a common CDMA segment can be assigned for CDMA access terminals to transmit their access probes. In this case, CDMA processing gain (spreading factor) and the CDMA segment allocation/dimensioning can be implemented in a manner that results in relatively small load on the CDMA segment. In such circumstances, a lower power base station can detect a weak access probe even in the presence of relatively strong interference (e.g., from a macro cell).

According to other aspects of the subject disclosure, interference avoidance for access communication can be implemented with a random re-use scheme, or planned re-use scheme. With random re-use, an access channel is sub-divided into subsets of access resources, and transmitters employ a random or pseudo-random algorithm to select a resource for the access communication (e.g., transmitting or responding to an access probe). Where network load is moderate compared with the number of available access resources, random re-use can mitigate interference for access communication. For planned re-use, access resources are reserved for particular BSs or types of BSs. Reservation of resources can be based on negotiations between BSs, comparing respective quality of service (QoS) requirements, current load, and so on, of the different BSs, or can be determined at a central planning component (e.g., a radio network controller [RNC]) based on similar criteria. Reservation of resources in a planned re-use scheme can be implemented for a limited time, indefinitely, for a default time, until load or interference conditions change, or the like.

In one particular aspect of the subject disclosure, re-use schemes are implemented dynamically based on changing interference or network load conditions. Measurements of network load are obtained and compared with different load thresholds. Degrees of load thresholds can be based, for instance, on acceptable interference levels on particular access resources. Where load/interference measurements are below a minimum threshold, natural re-use can be employed, where different transmitters independently select resources of a common access channel. Where load/interference measurements rise above the minimum threshold, random re-use can be employed, to increase likelihood of distributed use of subsets of channel resources. On the other hand, where load/interference measurements rise above a maximum threshold, planned re-use can be implemented to spread existing terminals among the subsets of access resources. Further to the above, when load or interference drops below the maximum threshold, random re-use can be implemented, saving processing resources involved with resource negotiations. Additionally, if load or interference drops below the minimum threshold, natural re-use can again be implemented to further reduce processing associated with resource selection.

Referring now to the figures, FIG. 1 illustrates a block diagram of an example system 100 according to aspects of the subject disclosure. System 100 comprises a signal acquisition apparatus 102 having an interface with a wireless transceiver 116. Signal acquisition apparatus 102 is configured to obtain wireless signal resources and select a subset of the resources according to a re-use scheme. The subset can be employed by wireless transceiver 116 for transmitting or receiving wireless communication signals related to network access, access grant, or related tasks. In some aspects of the subject disclosure, signal acquisition apparatus 102 can be installed at a wireless BS (e.g., macro cell, micro cell, femto cell, etc.). In other aspects, signal acquisition apparatus 102 can be implemented as part of a network control component (e.g., an RNC) communicatively coupled with one or more wireless BSs (116) for centralized resource allocation.

Signal acquisition apparatus 102 comprises a data processor 104 for executing one or more resource selection modules (106, 108) stored in memory 114. Particularly, data processor 104 can execute a re-use module 106 that establishes a re-use scheme for wireless communications of wireless transceiver 116. A particular re-use scheme established by re-use module 106 can be based on one or more criteria associated with the wireless transceiver 116, or traffic supported by wireless transceiver 116. In one aspect of the subject disclosure, the re-use scheme can be based at least in part on a type of wireless network BS that is associated with wireless transceiver 116. Thus, for instance, a first re-use scheme can be established if transceiver 116 is associated with a macro BS and a different re-use scheme if transceiver 116 is associated with a femto BS. As an alternative, the re-use scheme could be based on whether the wireless network BS is a general access BS or a restricted access BS (e.g., having a limited set of associated access terminals). In other aspects of the subject disclosure, the re-use scheme can be selected based on current or anticipated load at the wireless transceiver 116. In yet other aspects, the re-use scheme can be selected based on UL or DL interference measurements determined by the wireless transceiver 116 or a terminal served by the wireless transceiver 116, respectively. In still other aspects, the re-use scheme can be established based on a combination of the foregoing criteria, or similar criteria.

The re-use scheme is output as a file 108 to a selection module 110. Selection module 110 employs the re-use scheme 108 to identify a subset of access communication resources to be employed by wireless transceiver 116 for access-related communication. For a natural re-use scheme, selection module 110 can allocate the full bandwidth of an access channel. Alternatively, a subset of the full bandwidth can be allocated based on a fixed identifier associated with wireless transceiver 116 (e.g. a distinct BS identifier) or an identifier of a terminal served by wireless transceiver 116. For a random re-use scheme, selection module 110 can execute a random or pseudo-random algorithm stored in memory 114 to select a subset of resources (e.g., time-frequency resources, code resources, symbol resources, and so on) of the access channel. For a planned re-use scheme, selection module 110 can employ negotiation instructions stored in memory 114 to obtain criteria affecting communication quality from wireless transceiver 116 and at least one other wireless BS (not depicted). Based on comparison of the respective quality criteria (e.g., including current load, QoS commitments, measured interference, or the like), a subset of access channel resources can be established for use by wireless transceiver 116.

Selected resources are output in a resource file 112, and stored in memory 114. Where signal acquisition apparatus 102 is a network component separate from a BS, the resource file 112 can be conveyed to the BS (116) for communication scheduling. Where signal acquisition apparatus 102 is a part of the BS, data processor 104 can be employed to schedule access communication based on the selected resources 112. Wireless transceiver 116 can then broadcast the selected resources 112 to mobile devices served by the BS. Upon receiving the broadcast, such devices can identify UL resources for transmitting an access grant to wireless transceiver 116, and tune to particular DL resources over which the wireless transceiver 116 will respond.

By employing various re-use schemes for allocation or selection of orthogonal wireless resources, various levels of network load can be accommodated while mitigating network interference. This flexibility can also result in increased scalability for the network. In some aspects, signal acquisition for lower power BSs within a macro coverage area can be improved, by allocating particular resources for such BSs. Particularly, where the macro cell is configured to blank or transmit at reduced power on resources allocated to lower power BSs, reduced interference for various types of BSs transmitted at various power levels can often result.

Figure 2:
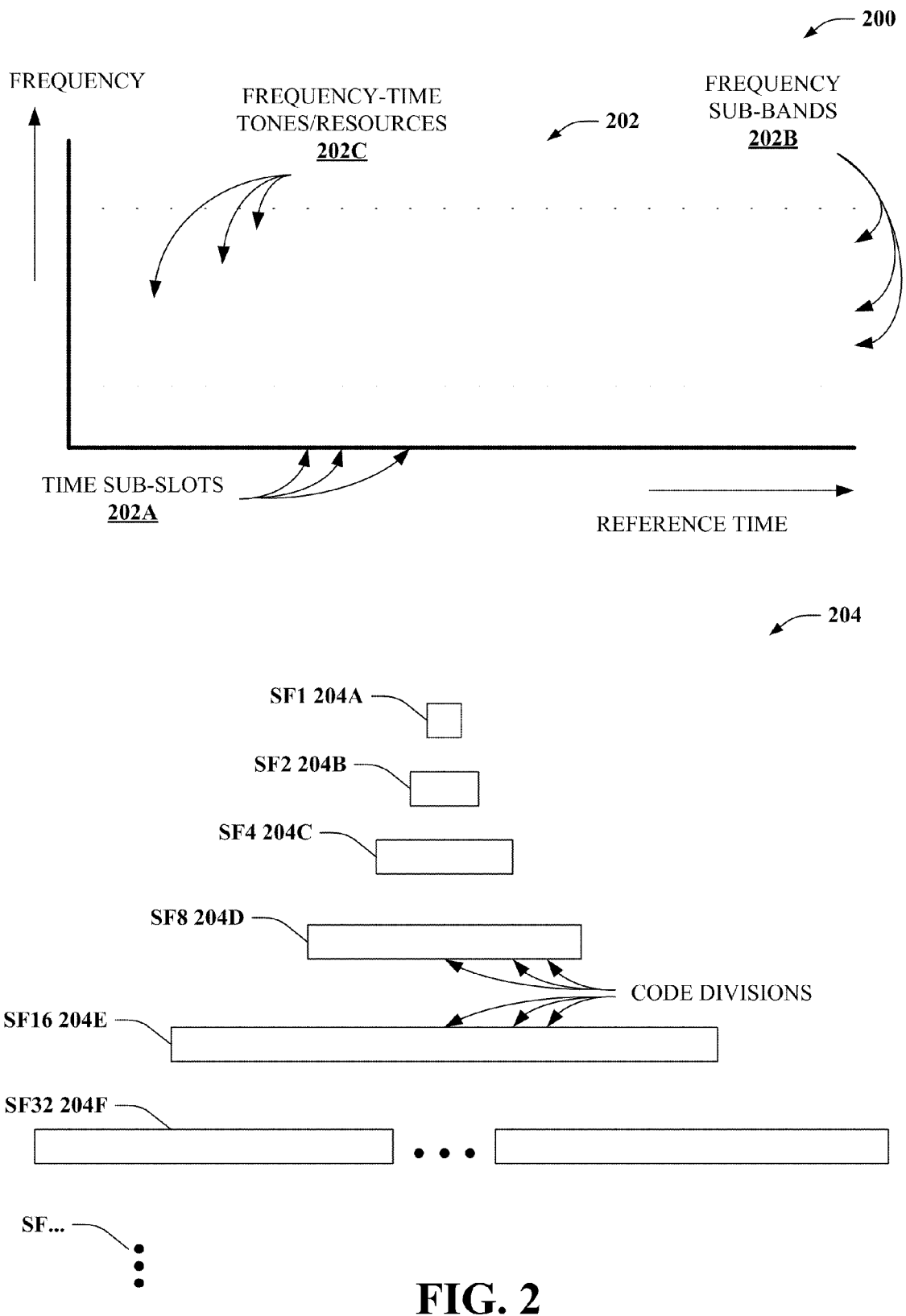
FIG. 2 illustrates a block diagram of example wireless resources for disparate wireless access technologies according to further aspects.

FIG. 2 depicts example illustrations 200 of segmented wireless signal resources 202, 204 for different wireless access technologies. An example OFDM signal is depicted at 202. The horizontal axis represents time, while the vertical axis represents frequency. As depicted, signal 202 is divided into multiple time resources 202A, or time sub-slots, along the horizontal axis and multiple frequency resources 202B, or frequency sub-bands, along the vertical axis. Each intersection of a frequency sub-band and a time sub-slot is a single time-frequency resource 202C. Wireless data transmitted during a particular time sub-slot and at a particular frequency sub-band is therefore transmitted on a corresponding time-frequency resource (202C).

For multiple access systems, there may be many access terminals connected to or attempting to connect to a network concurrently. If more than one of these terminals sends data on a single time-frequency resource (202C), significant interference can result at a receiver. If the receiver can still distinguish interfering signals, the communication may be able to persist. In such a case, a natural re-use scheme where a full access channel bandwidth (202B) or significant portion thereof is employed for access communication may be sufficient. Where interference among transmitters does degrade wireless communications beyond an acceptable level, random re-use can be employed by the terminals (or by a BS) to randomly select particular tones/resources 202C for respective transmitters, reducing likelihood that the interfering transmitters employ common resources. Where interference among the transmitters is especially severe, a planned re-use can be employed to ensure that the transmitters are employing distinct orthogonal resources. In some instances, where interference is severe or where a desired signal is especially low, planned re-use can allocate different time sub-slots to different transmitters, and require the transmitters to blank a sub-slot allocated to the other transmitter.

Wireless signal 204 is a CDMA signal comprising multiple spreading factors (SF). CDMA signals employ different code sequences to spread data transmitted at a particular frequency, over a wide range of frequency bands. This spreading is determined by a particular code employed, and reduces interference between concurrent transmissions at different spreading factors. As depicted, the CDMA signal 204 comprises an SF1 segment 204A, an SF2 segment 204B, an SF 4 segment 204C, and SF8 segment 204D, and SF16 segment 204E and an SF 32 segment 204F. It should be appreciated, however, that the signal 204 can be further segmented into higher order spreading factors. Assigning different resources for different transmitters enables concurrent wireless communications for several devices. Additionally, by employing re-use schemes described herein, flexibility and scalability can be afforded even for heterogeneous access point environments.

Figure 3:
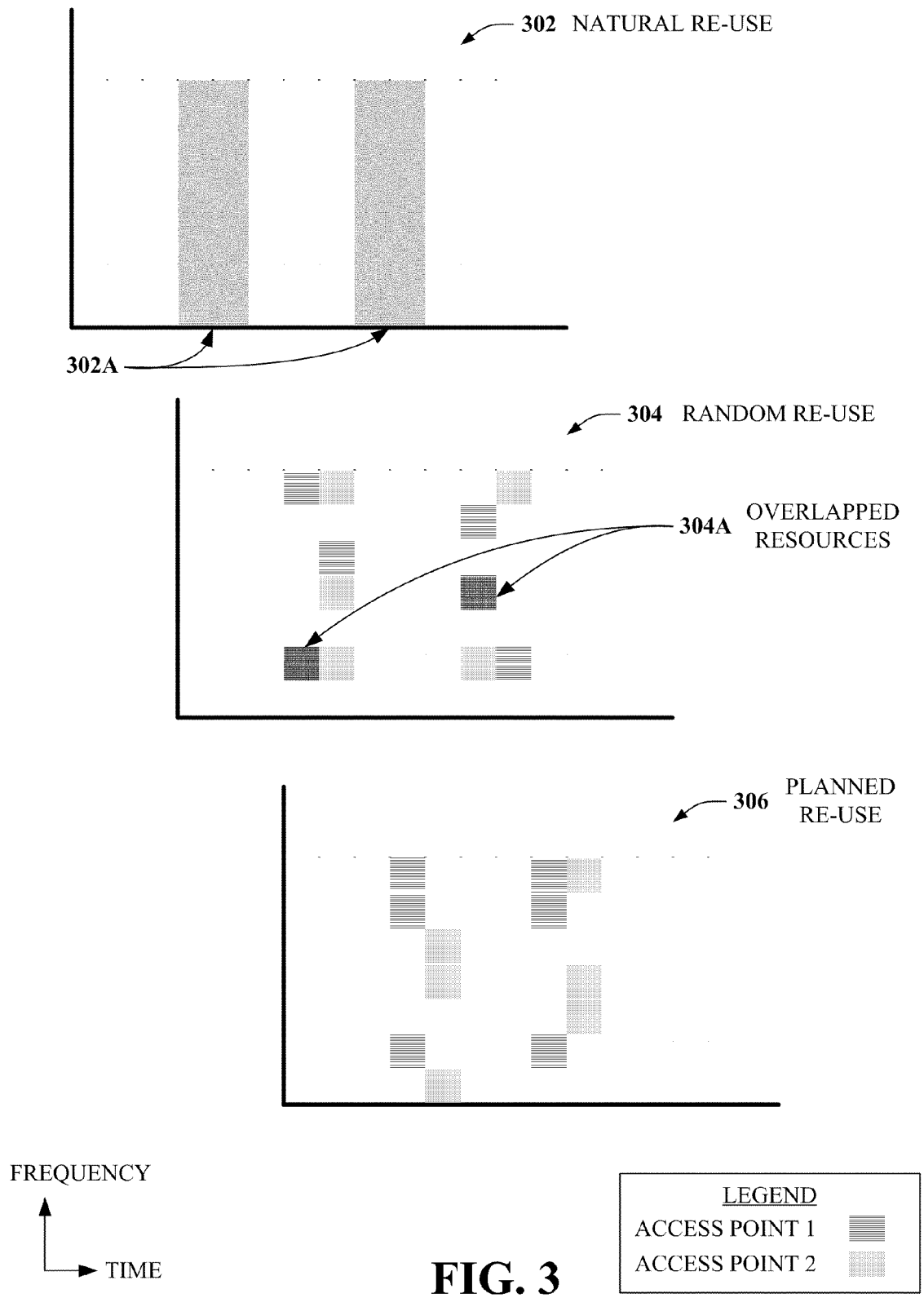
FIG. 3 illustrates a block diagram of example resource re-use algorithms according to additional aspects of the subject disclosure.

FIG. 3 illustrates example UL resource allocation for an OFDMA system based on different re-use schemes described herein. It should be appreciated that the resource allocation and signal resource segmentation are for illustrative purposes, and are not exclusive. Rather, other suitable access channel configurations, or re-use configurations can be implemented within the scope of the subject disclosure.

An example natural re-use scheme is depicted at 302. Wireless signal 302 comprises an example set of access channel resources, depicted as grayed out resource blocks 302A. The access channel resources 302A comprise the full spectrum bandwidth, during four different time sub-slots. Where network load is relatively light, resulting in few concurrent transmissions on the access channels 302A in any given time frame of wireless signal 302, a natural re-use on these channels 302A results. In such case, transmitters can employ the entire channel spectrum 302A for access communications (e.g., during DL frames for BSs, and UL frames for access terminals) with minimal interference. Alternatively, the transmitters can select a subset of the channels 302A using various criteria (specified by a terminal manufacturer, by a wireless network, or the like). In one case, selection of the subset of resources can be based on an identifier associated with the respective transmitter. Since transmitter identifiers (e.g. media access [MAC] address, serial number, or the like) are typically distinct, a selection algorithm employing a distinct or unique identifier can often in distinct subsets of access resources 302A, further reducing likelihood of concurrent transmissions on identical resources.

Wireless signal 304 depicts a random allocation of subsets of resources from access channels 302A. Particularly, signal 304 depicts UL resources selected by different access points, access point 1 (lined fill) and access point 2 (dotted fill). For random allocation, each respective access point independently employs a random or pseudo-random function to select a number of time-frequency resources for access communications. The number of resources can further depend on QoS commitments, current wireless conditions, current load, or the like. For instance, if an access point is near load capacity, a larger number of resources can be selected with the algorithm(s). Although random re-use can result in overlapped resources 304A (in which multiple access points select the same time-frequency resource for access-related communication), such occurrences will be statistically infrequent if a network access point is below a particular load threshold (compared with a number of available resources, and number of resources selected per transmitter). Additionally, random re-use can be implemented independently by different transmitters, resulting in minimal processing overhead and minimal resource selection times.

Wireless signal 306 depicts a planned re-use allocation of respective subsets of access channel 302A resources. The planned re-use is implemented via negotiations between different transmitters, or by a central controller that can obtain pertinent information from the different transmitters. In one aspect of the subject disclosure, different BSs can exchange data pertaining to current or anticipated access channel traffic requirements (e.g., via a backhaul network). The BSs can employ an allocation algorithm that assigns a subset of resources to specified BSs based on respective requirements. BSs with higher requirements can be assigned a greater number of resources, or higher priority resources, or the like. Additionally, a BS will typically blank, or transmit with reduced power on, a resource assigned to a different BS. The BS can transmit up to full power on resources assigned to it, on the other hand. Accordingly, planned resource re-use minimizes resource overlap by specifically reserving resources for particular BSs. A similar mechanism can also be applied for UL resources allocated to access terminals.

In at least one other aspect of the subject disclosure, an access terminal can negotiate to secure UL resources for itself, or DL resources for a BS serving the access terminal. In the former case, the access terminal requests allocated resources from the serving BS, which instructs other access terminals to transmit with reduced power on the allocated resources. Alternatively, or in addition, the access terminal can request neighboring cells for allocation of UL resources as well. The serving or neighboring BS(s) can grant the request based on various criteria, including current load, resource availability, anticipated load/availability, QoS requirements for the access terminal versus other terminals, a quality stipulation in a subscription plan associated with the access terminal, or like criteria, or combinations thereof.

For DL resources, the access terminal can send an interference avoidance request to a BS neighboring or interfering with the serving BS. The avoidance request can specify a set of resources selected by the serving BS or by the access terminal (e.g., based on a random or planned re-use scheme). The access terminal can negotiate with the neighboring/interfering BS (e.g. utilizing negotiation rules specifying resource allocation as a function of QoS commitments, current/anticipated load, etc.) and convey an agreement provided by such BS to the serving BS.

In at least one aspect of the subject disclosure, an access terminal served by a low power BS, or a restricted access BS, can attempt to secure interference avoidance from a nearby macro cell. Based on network resource reservation rules, the macro cell can approve or deny the avoidance request, and transmit a response to the access terminal. If the request is approved, the macro cell can specify the reserved resources as well as a default time over which the agreement will be observed. After such time, the macro can resume transmitting or transmitting at full power on the reserved resources, unless a subsequent agreement is reached based on the network rules or supplemental rules (e.g., defining macro behavior in successive interference avoidance requests). In such a manner, femto BSs can operate within a larger macro environment with mitigated interference.

Figure 4:
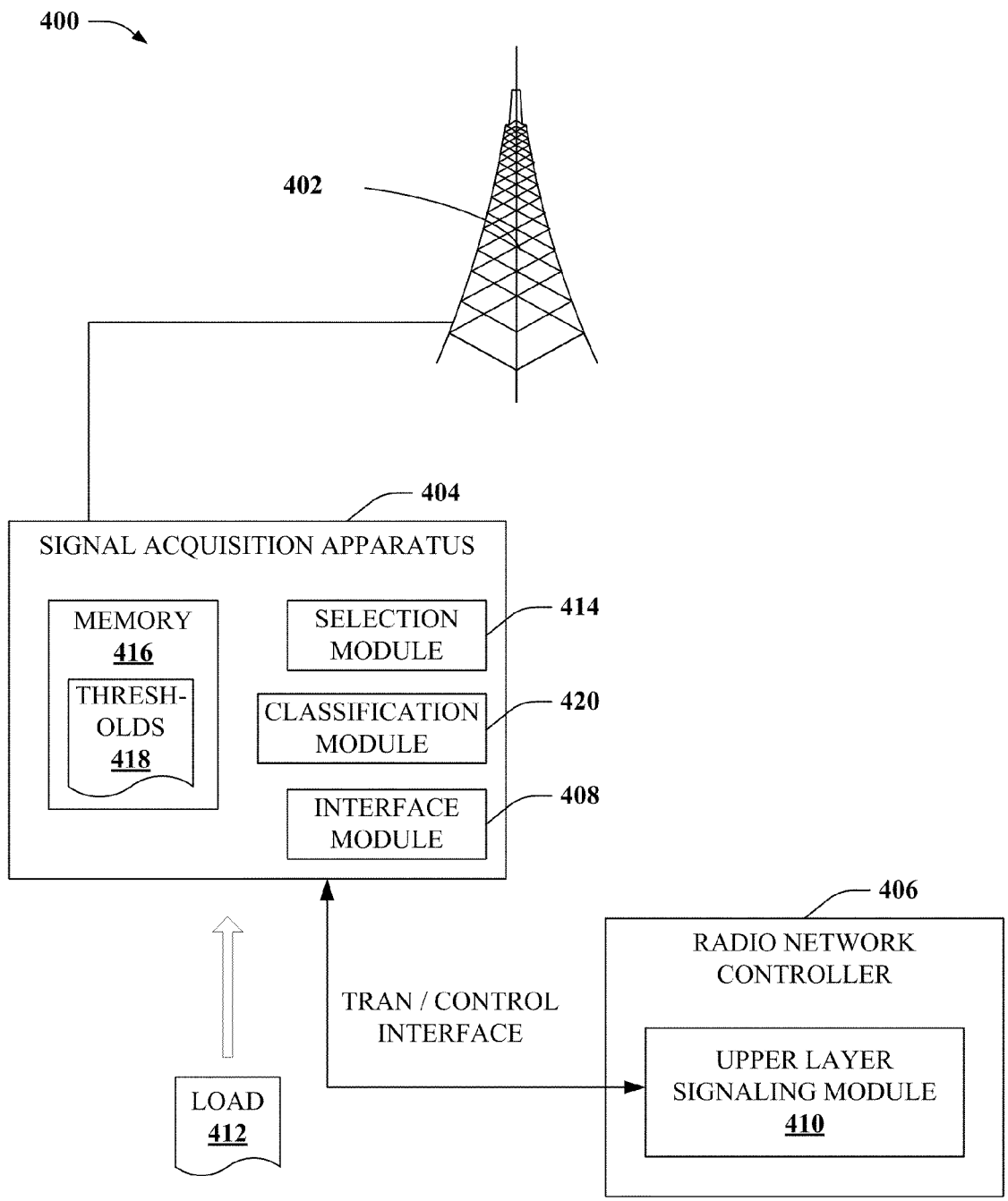
FIG. 4 depicts a block diagram of an example system that allocates access resources based on network performance measures.

FIG. 4 illustrates a block diagram of an example system 400 according to particular aspects of the subject disclosure. System 400 comprises a base station transmitter 402 coupled with a signal acquisition apparatus 404. Signal acquisition apparatus 404 is configured to dynamically implement resource re-use for access communications pertaining to base station transmitter 402. According to some aspects of the subject disclosure, the resource re-use depends on a category of the base station transmitter 402, of wireless traffic maintained by transmitter 402, or of access terminals served by the transmitter 402. Alternatively, or in addition, the resource re-use can be dependent on prevailing network load and interference conditions. As conditions change, different re-use schemes can be implemented to balance signal interference with processing requirements and delay associated with the various re-use schemes.

Signal acquisition apparatus 404 can comprise an interface module 408 communicatively coupled with a radio network controller (RNC) 406 via a terrestrial radio access network (TRAN)/control network interface. The RNC 406 can further comprise an upper layer signaling module 410 that obtains estimates of network load for base station transmitter 402. Additionally, the upper layer signaling module 410 can obtain estimates of network load from neighboring transmitters (not depicted), including neighboring macro cells, as well as neighboring micro, pico or Femto cells. For macro cells, network load can be obtained from service estimates and separate traffic flows served by base station transmitter 402, as well as the neighboring macro cells. The load information can be maintained in a network database (not depicted), and accessed by the upper layer signaling module 410. A similar mechanism can be employed for other access points coupled with RNC 406 (e.g., micro or pico cells). For Femto cells, network load estimates can be obtained directly from the Femto cells (e.g., via an Internet connection between the Femto cell and wireless network), or from access terminals served by the Femto cells, which bundle the load estimate into an upper layer signaling message and transmit the message to base station transmitter 402 (which can forward the message to RNC 406 via interface module 408). According to some aspects of the subject disclosure, base stations (or access terminals) can also upload QoS commitments for respective traffic supported by the base stations to the network. The QoS commitments can be stored in the above network database and accessed by upper layer signaling module 410. The upper layer signaling module 410 can filter load estimates (and QoS commitments) pertinent to base station transmitter 402, and provide such information to signal acquisition apparatus 404 in a BS load message 412.

A selection module 414 can access the load message 412 to determine relative loading for base station transmitter 402. Additionally, selection module 414 can access a set of interference thresholds 418 stored in memory at signal acquisition apparatus 404. Based on current or anticipated load and measured or estimated interference relative the interference thresholds (e.g., see FIG. 5, infra), selection module 414 can select a re-use scheme for base station transmitter 402, as described herein.

In at least one aspect of the subject disclosure, selection of access resources can be based instead (or in addition) on a category of the transmitter 402 established by a classification module 420. Specifically, classification module 420 can establish a set of base station categories based on different transmit power, access association, cell type, or the like, or a combination thereof. As one example, classification module 420 can classify high power base stations (e.g., over 20 watt) and low power base stations (e.g., under 20 watt), as well as general access and restricted access base stations. Based on the particular classification, a predetermined set of access resources can be assigned to base station transmitter 402 and neighboring/interfering base stations. Allocating resources based on base station category can be implemented independently of re-use scheme, or in conjunction with a planned re-use scheme, for instance. Accordingly, where interference at base station transmitter 402 (or an access terminal served by such transmitter 402) exceeds a level associated with planned re-use (e.g., established by threshold protocols 418), selection module 414 establishes a subset of access resources allocated for base station transmitter 402. The allocation can be for a limited period of time, until load drops below the interference level associated with planned re-use, or the like.

It should be further appreciated that interface module 408 can poll RNC 406 for updated network load measurements or QoS commitments, and provide the updated data to selection module 414. Based on the updated data, selection module 414 can implement a different re-use scheme, as established by threshold protocols 418. Accordingly, system 400 can provide a flexible and adaptive allocation of resources to mitigate wireless interference for base station transmitter 402.

Figure 5:
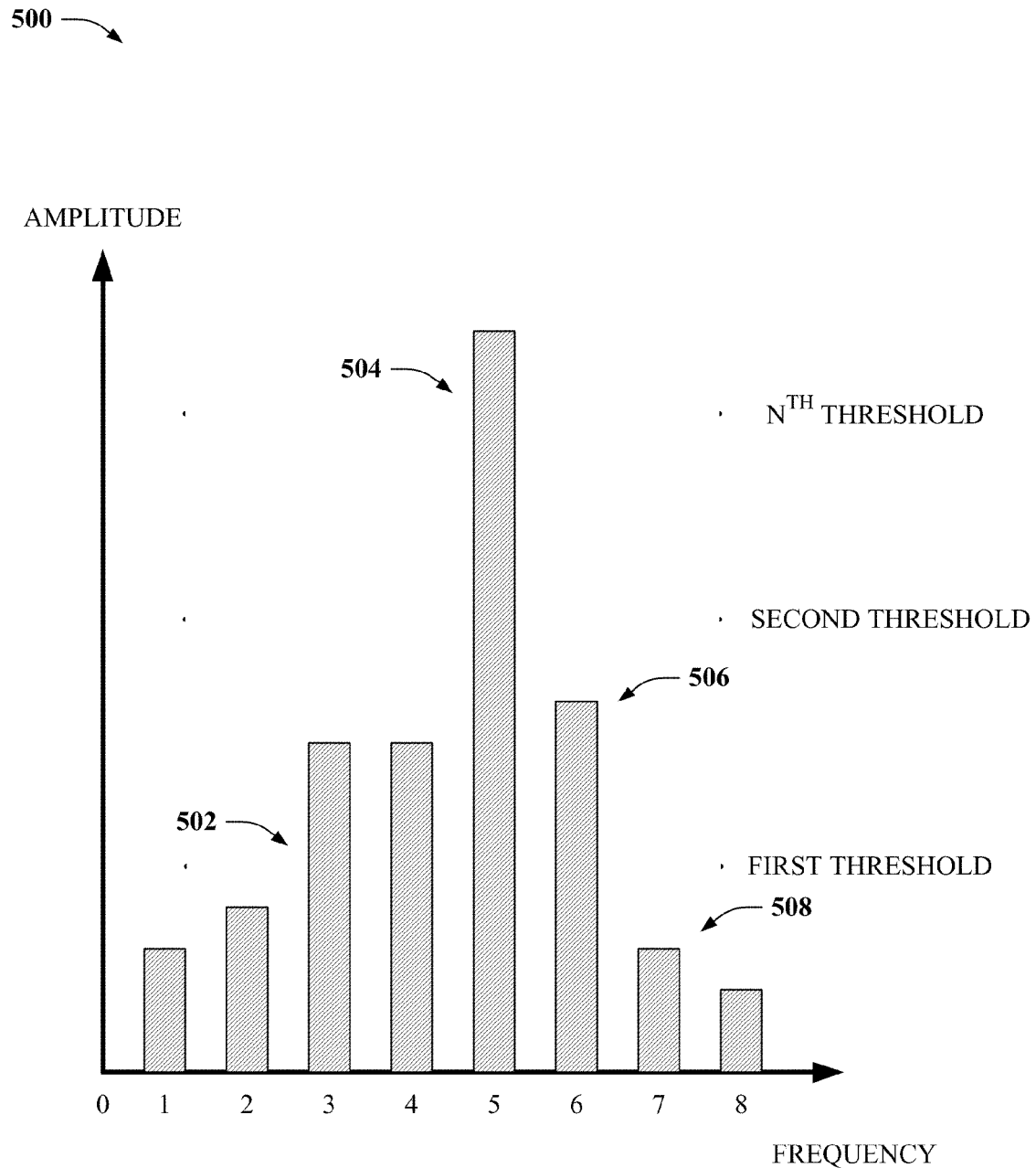
FIG. 5 illustrates a block diagram of an example network performance—threshold relationship for selecting access re-use schemes according to further aspects.

FIG. 5 illustrates a block diagram of an example graph 500 depicting interference at a wireless receiver as a function of interference thresholds. Graph 500 depicts frequency on a horizontal axis, and amplitude on a vertical axis. The amplitude vs. frequency levels can comprise measured interference at respective frequency bandwidths associated with a wireless network signal. The measurements comprising graph 500 can be conducted periodically, triggered based on a predetermined event (e.g., transmission of an access probe, receipt of an access probe), or the like.

Also as depicted, graph 500 includes a first, second . . . up to an $N^{th}$ interference threshold (where N is a positive integer) specified at varying interference amplitudes. Furthermore, the respective thresholds can be mapped to particular re-use schemes. Thus, at 502 interference amplitude at frequency level '3' and '4' exceed the first threshold. If a receiver measuring the interference amplitudes displayed at graph 500 employs frequencies '3', '4' or '6', a re-use scheme mapped to the first threshold can be implemented. At 504, interference at frequency '5' exceeds threshold 'N'; accordingly a receiver employing frequency '5' can implement a re-use scheme mapped to the $N^{th}$ threshold. Likewise, frequencies '1', '2', '7' and '8' are below the first threshold, and thus a default re-use scheme can be employed, such as natural re-use or no re-use.

Figure 6:
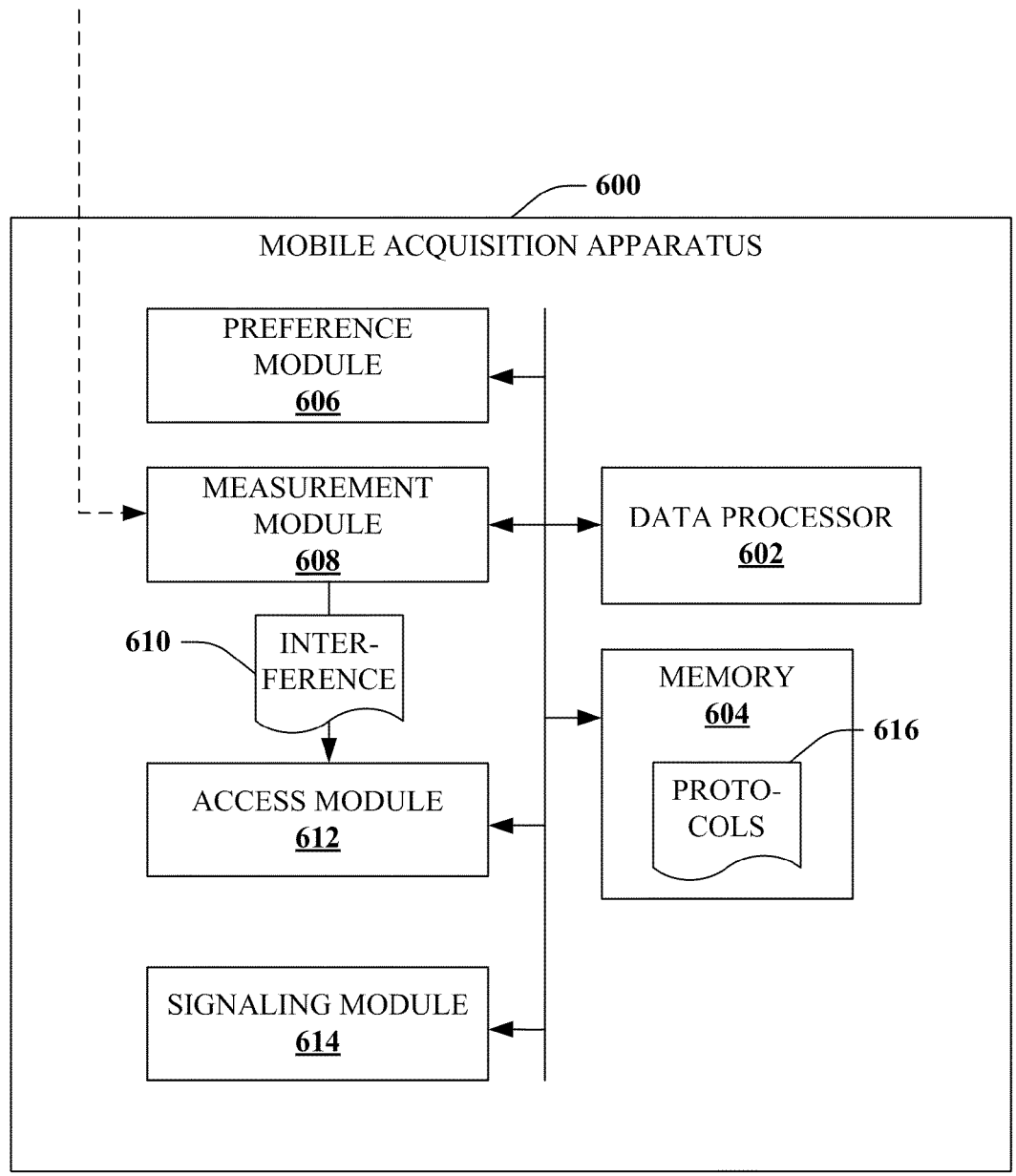
FIG. 6 depicts a block diagram of an example apparatus for targeted wireless network acquisition according to particular aspects disclosed herein.

FIG. 6 depicts a block diagram of an example mobile acquisition apparatus 600 according to aspects of the subject disclosure. Mobile acquisition apparatus 600 can be employed by a wireless access terminal (not depicted, but see FIG. 7, infra) selecting wireless resources for use in transmitting an access probe to a network access point. Particularly, mobile acquisition apparatus 600 can identify a preferred network access point for the mobile terminal, and implement a resource re-use scheme in communication with the preferred access point.

Mobile acquisition apparatus 600 can comprise a data processor 602 that executes a set of modules stored in memory 604. The modules can comprise a preference module 606 that monitors received DL signals from network access points, and identifies a preferred access point from the signals. Specifically, preference module 606 can analyze pilot signals or other acquisition pilots transmitted by wireless network access points and obtain an ID from the respective pilot signals. The IDs can be cross-reference with a list of preferred access points stored in memory 604. If an ID of a preferred access point is identified, preference module 606 stores the ID in memory for use by access module 612. Otherwise, no preferred ID is stored. In at least one aspect of the subject disclosure, the preferred access point comprises a femto BS associated with a host mobile device.

Data processor 602 can also execute an access module 612 that identifies access communication resources employed by a wireless network. A measurement module 608 can be employed to calculate prevailing interference on the identified access resources. A result 610 of the interference calculations is provided to access module 612. Additionally, the access module can employ stored protocols 614 to identify a subset of resources applicable for access communication. In some aspects, the stored protocols 614 can include rules for generating the subset of resources based on various conditions. For instance, the protocols can result in a first subset of resources if a wireless network access point is the preferred access point identified by preference module 606. In other aspects, the rules can result in a various subsets of resources depending on current load at the wireless network access point, or based on the interference level calculated by measurement module 608. Specifically, the rules can comprise different resource re-use schemes based on various interference levels, as described herein.

Once the proper subset of access resources is identified, a signaling module 614 generates an access probe requesting access to the wireless network access point. Furthermore, the access probe can be transmitted on the wireless resources identified by access module 612. As a result, mobile acquisition apparatus 600 can adapt to dynamic resource allocation schemes based on a set of rules stored in memory 604, or obtained from a proximate network (e.g., where the network broadcasts the rules).

Figure 7:
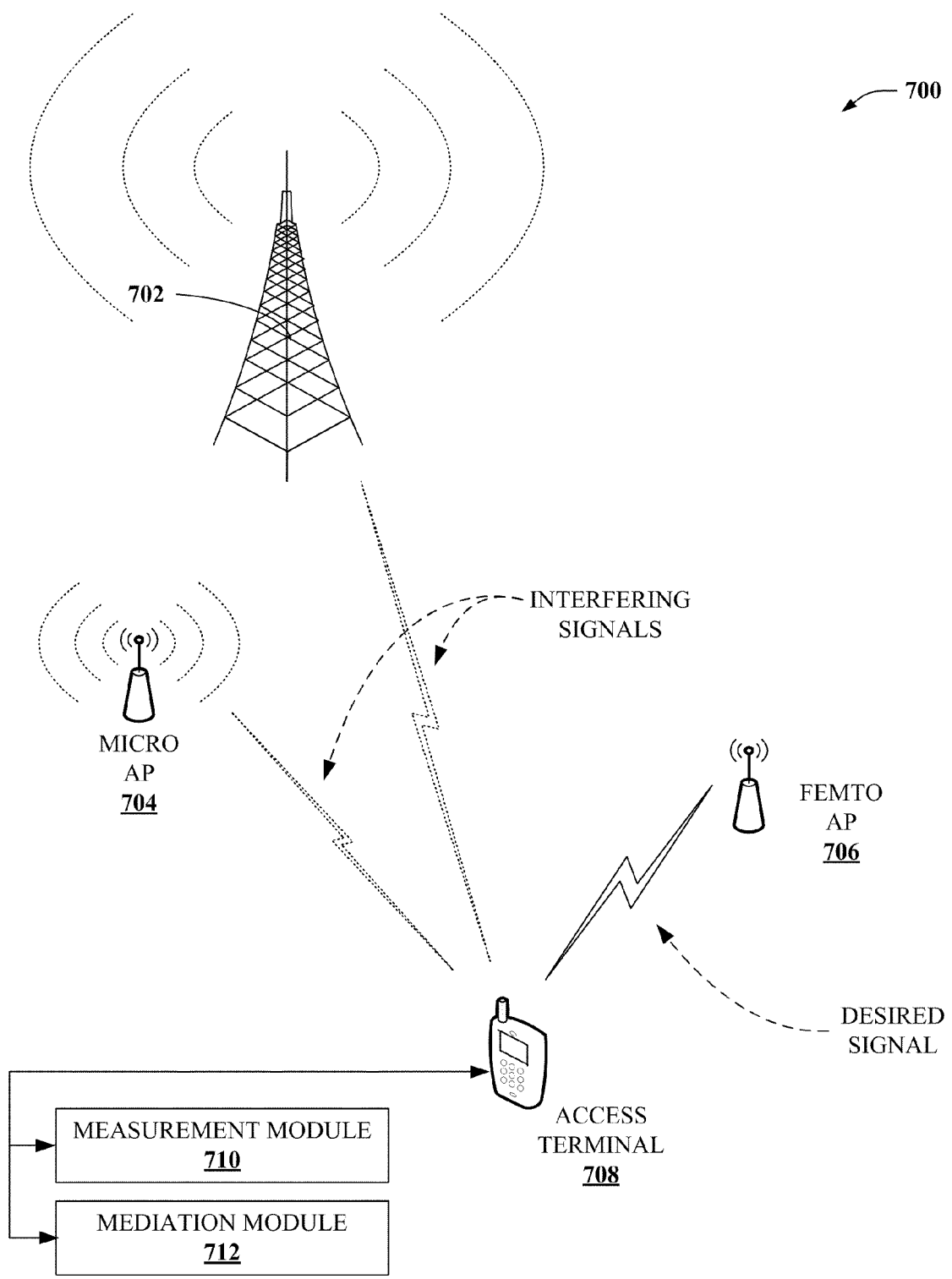
FIG. 7 illustrates a block diagram of an example system for interference mitigation in a heterogeneous access point wireless environment.

FIG. 7 illustrates a wireless network environment 700 comprising heterogeneous types of network access points according to particular aspects of the subject disclosure. As depicted, wireless environment 700 comprises a macro BS 402 providing wireless communication services to a macro cell. Furthermore, the environment 700 comprises a micro access point (AP) 404 providing wireless communication services to a micro cell (which can be partially or wholly within the macro cell). The environment 700 also comprises a Femto AP 706, serving a Femto cell partially or wholly within the macro cell. Femto AP 706 is a restricted access base station that maintains a list of access terminals authorized for network services; other access terminals that are not on the list are denied network services by the Femto AP 706.

Additionally, the environment 700 comprises an access terminal 708 included in the restricted access list maintained by Femto AP 706. Access terminal 708 can sample transmissions of the respective base stations 702, 704, 706 and attempt to identify the access points based on transmitter IDs broadcast in respective pilot or acquisition signals. Based on the transmitter IDs, access terminal 708 can identify Femto AP 706 as a preferred access point, and prepare an access probe to connect to the Femto AP 706. According to some aspects of the subject disclosure, access terminal 708 can analyze a broadcast channel employed by Femto AP 706 to obtain acquisition signal resources for transmitting the access probe. In other aspects of the subject disclosure, access terminal 708 can identify or generate appropriate acquisition signal resources (e.g., see FIG. 6, supra) based on the type of the access point (e.g., restricted access, Femto, low power). Alternatively, or in addition, the acquisition signal resources can be based at least in part on relative interference measurements of the respective APs 702, 704, 706 and a set of interference thresholds, as described herein. Once the appropriate access resources are identified, access terminal 708 can transmit the access probe discussed above, requesting access to Femto AP 706.

According to particular aspects of the subject disclosure, access terminal 708 can comprise a mediation module 712 that facilitates reduced DL interference for a selected or serving access point. As an example, upon selecting an access point (706) in the wireless environment 700, access terminal 708 can employ measurement module 710 to measure DL interference from neighboring access points (702, 704). If the interference from a particular access point (702, 704) is above a predetermined threshold, mediation module 712 can send an interference avoidance request to the interfering access point (702, 704).

Optionally, access terminal 708 can specify a subset of DL resources employed by the selected access point (706) for access grant/denial messages. The subset of DL resources can be broadcast by the selected access point (706), or generated by access terminal 708. In one example, access terminal 708 can generate the subset of resources from network load conditions or prevailing DL interference conditions transmitted by a network access point (702, 704, 706). Alternatively, or in addition, the subset of resources can be estimated from interference measurements performed by measurement module 710.

If an interference avoidance request is granted by the neighboring/interfering base station(s) (702, 704), access terminal 708 can include the grant in an access probe or other message transmitted to the selected access point (706). Optionally, the message/probe can specify particular resources reserved for the selected access point (706) as a result of the interference avoidance request. Access terminal 708 can then monitor the specified resources for an access grant or access denial in response to the access probe. By employing selected UL resources based on measured interference, access terminal 708 can increase likelihood that the selected access point will receive the probe. Additionally, by requesting neighboring/interfering access points to reserve (e.g., transmit with no power or reduced power) selected DL resources, access terminal 708 can increase likelihood that the response to the access probe is received as well. Accordingly, system 700 can result in improved access communication in a wireless environment.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include access terminal 708, Femto AP 706, base station transmitter 402 and signal acquisition apparatus 404, or a different combination of these or other modules. Sub-modules could also be implemented as modules communicatively coupled to other modules rather than included within parent modules. Additionally, it should be noted that one or more modules could be combined into a single module providing aggregate functionality. For instance, measurement module 710 can include mediation module 712, or vice versa, to facilitate calculating signal interference and requesting interference avoidance by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
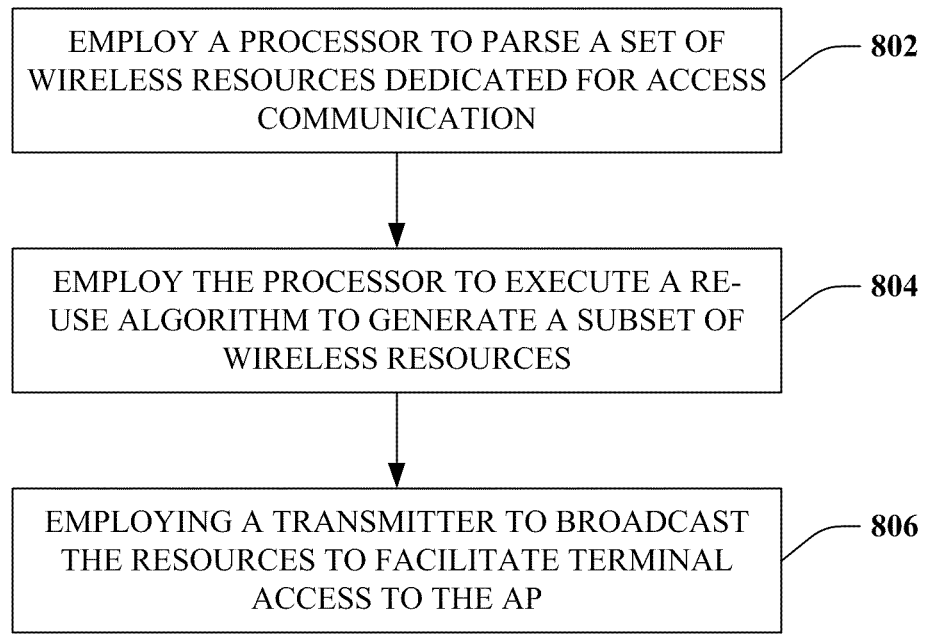
FIG. 8 depicts a flowchart of a sample methodology for facilitating signal acquisition for low power network access points according to some aspects.

FIG. 8 illustrates a flowchart of an example methodology 800 according to aspects of the subject disclosure. At 802, method 800 can employ a data processor to parse a set of wireless resources dedicated for access communication. The resources can include one or more channels specified as default or general use channels for access communications. At 804, method 800 can employ the data processor to execute a re-use algorithm that generates a subset of the wireless resources for a particular network access point. The re-use algorithm can be employed conditionally, for instance where network load or network interference rise above a minimum threshold. At 806, method 800 can broadcast the subset of resources to access terminals. Terminals can submit access probes utilizing the specified subset of resources, and reduce interference with respect to access probes transmitted to neighboring base stations.

Figure 9:
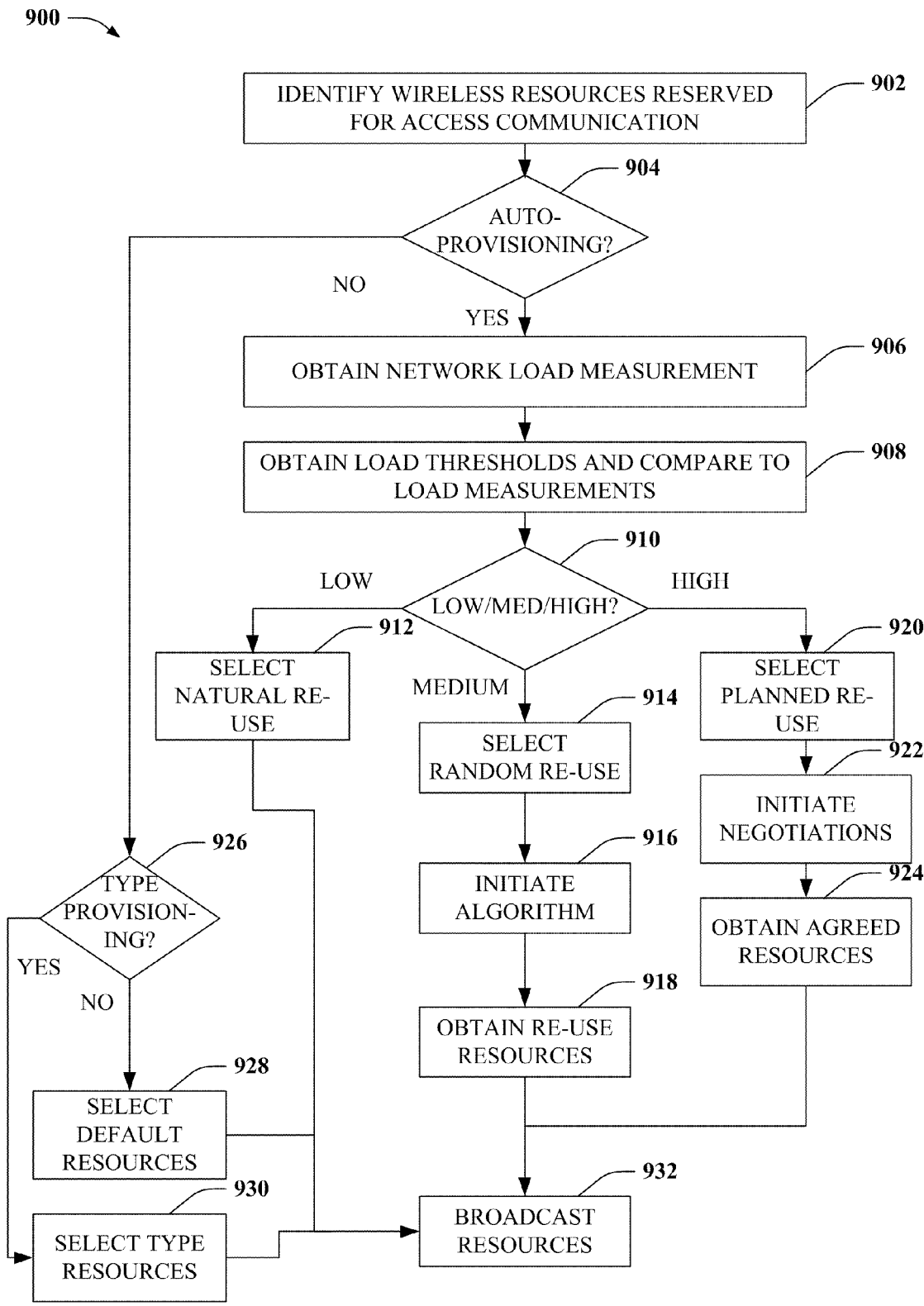
FIG. 9 illustrates a flowchart of an example methodology for dynamic resource allocation based on network performances measures.

FIG. 9 depicts a flowchart of a sample methodology 900 for providing updated re-use based on dynamic network conditions. At 902, method 900 can identify wireless network resources reserved for access communication. Such communication can comprise UL resources for transmitting access probes, and DL resources for responding to such probes. At 904, a determination is made as to whether a network employs auto-provisioning for re-use selection. If so, method 900 proceeds to 906; otherwise method 900 proceeds to 926.

At 906, method 900 can obtain network load measurements. The load measurements can be UL measurements calculated at a network receiver, or DL measurements calculated by an access terminal, or both. AT 908, method 900 can obtain load thresholds (stored in memory) mapped to one or more re-use schemes, and compare the network load measurements to the respective thresholds. At 910, method 900 can make a determination as to whether network interference is low, medium or high, based on the threshold comparison. For low interference, method 900 proceeds to 912. For medium interference, method 900 proceeds to 914. For high interference, method 900 proceeds to 920.

At 912, method 900 can select a natural re-use algorithm for access resources associated with an access point. Natural re-use can involve transmitting on default access channels. Alternatively, natural re-use can involve utilizing a set of access channel resources associated with a particular type of access point (e.g., based on transmit power, coverage, association type). From 912, method 900 proceeds to 932 and broadcasts the selected access resources determined from the natural re-use algorithm.

At 914, method 900 can select a random or pseudo-random algorithm for selecting resources of an access channel. At 916, method 900 can initiate the algorithm and generate a subset of selected resources. At 918, method 900 can obtain the resources, and broadcast the resources at 932.

At 920, method 900 can select a planned re-use algorithm based on high interference. AT 922, method 900 can initiate negotiations with a neighboring or interfering base station. Negotiations can be conducted over a backhaul network (e.g. wired or wireless connection) or can be conducted over-the-air via an access terminal. Additionally, negotiations can be governed by planned re-use rules, giving resource priority based on QoS commitments, network load, or a combination thereof. Based on relative priority of a set of access points, subsets of resources are allocated to respective base stations at 924. Respective resources are transmitted by respective base stations at 932.

For static resource provisioning, method 900 proceeds from 904 to 926. At 926, method 900 can determine whether type-based provisioning is employed. If so, method 900 proceeds to 930 where resources are selected based on transmit power, association type or like category of base station. If no type provisioning is employed by the network, a default set of resources are selected at 928. Method 900 can proceed for 928 or 930 to 932, and broadcast the respective resources.

Figure 10:
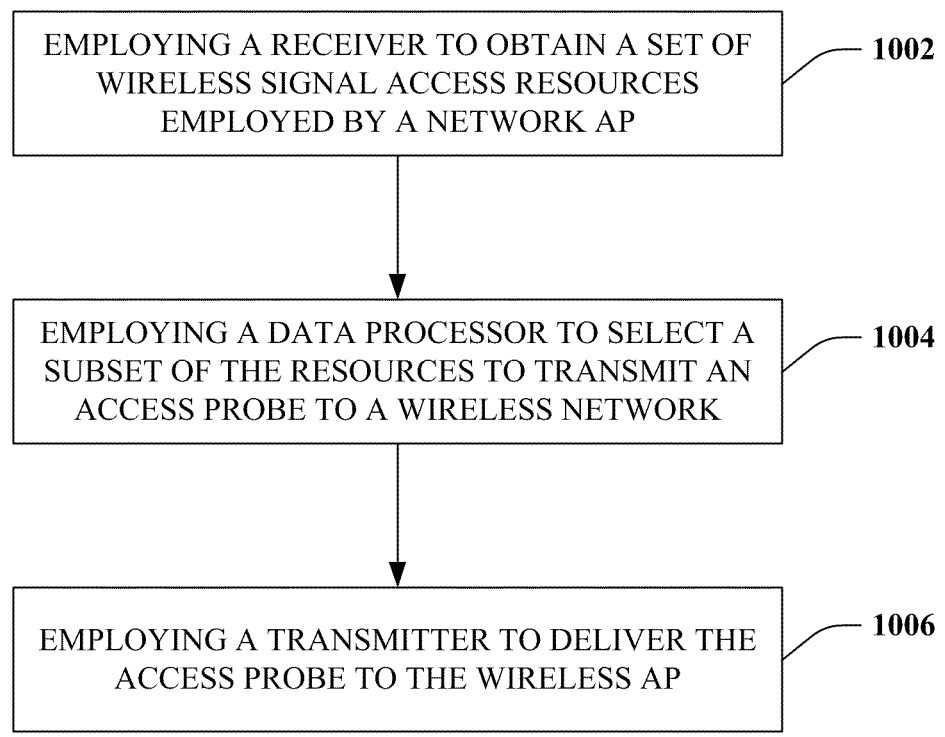
FIG. 10 depicts a flowchart of a sample methodology for wireless network acquisition according to one or more disclosed aspects.

FIG. 10 depicts a flowchart of an example methodology 1000 according to further aspects of the subject disclosure. At 1002, method 1000 can employ a receiver to obtain a set of wireless signal access resources employed by a network access point. At 1004, method 1000 can employ a data processor to select a subset of the resources to transmit an access probe to a wireless network. Additionally, the access probe can include a set of DL resources reserved for the network access point, by a neighboring or interfering access point. At 1006, method 1000 can employ a transmitter to deliver the access probe and DL resources to the network access point.

Figure 11:
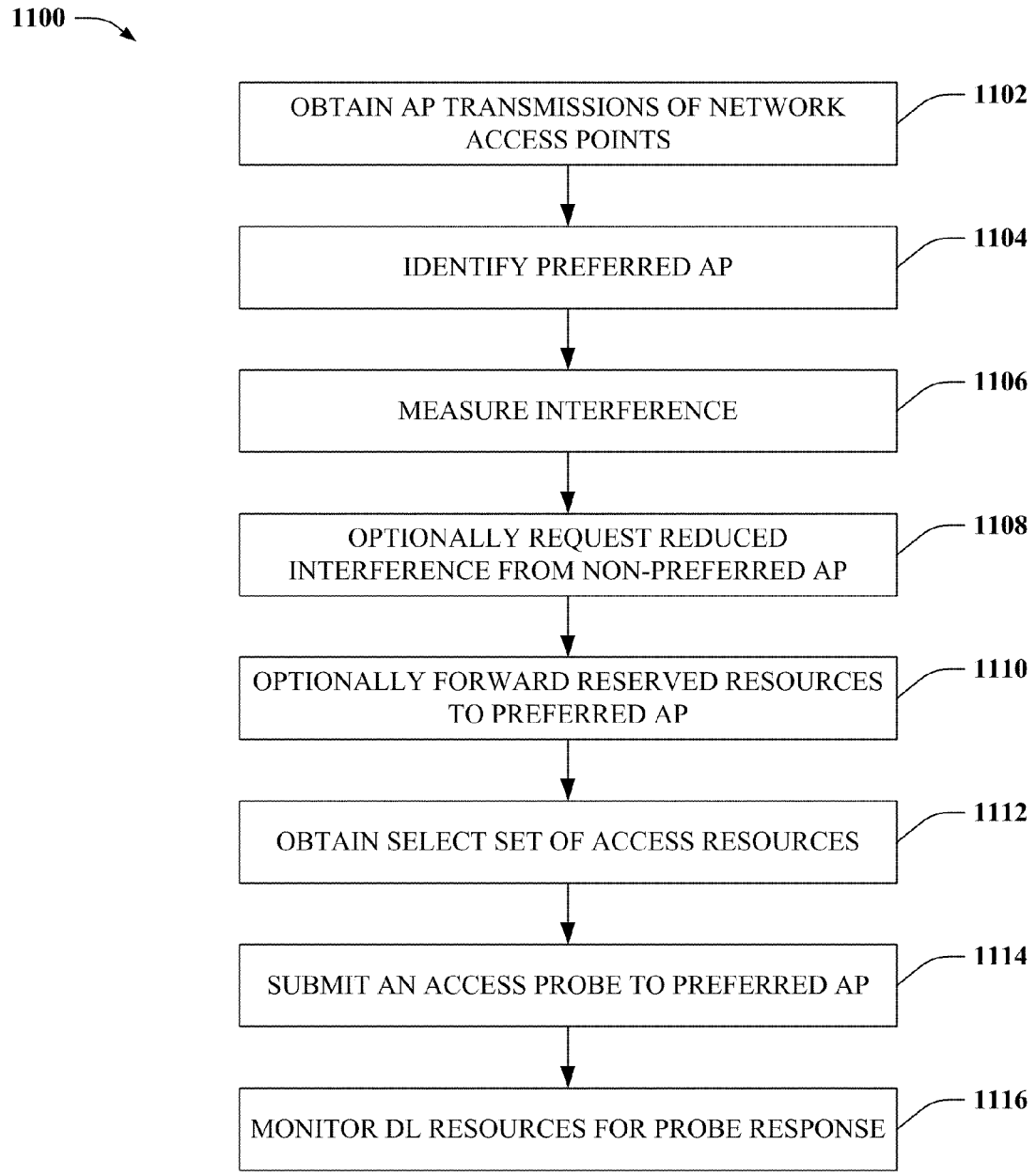
FIG. 11 illustrates a flowchart of a sample methodology for facilitating over-the-air interference mitigation according to further aspects.

FIG. 11 illustrates a flowchart of a sample methodology 1100 for adaptive access to a wireless network. At 1102, method 1100 can obtain access point pilot transmissions of a set of network access points. At 1104, method 1100 can identify a preferred access point. At 1106, method 1100 can measure interference of the non-preferred access point signals with respect to the preferred access point signal. At 1108, method 1100 can optionally request reduced interference from non-preferred access points. The request can be based on a minimum measured interference from such non-preferred access points, for instance. Additionally, at 1110, method 1100 can optionally forward specified DL resources reserved for the preferred network access point, if any.

At 1112, method 1100 can obtain a select set of access resources for submitting an access request to the preferred network access point. According to some aspects of the subject disclosure, the set can be obtained from the preferred network access point, or broadcast from a neighboring access point. In other aspects of the subject disclosure, the set of access resources can be generated at an access terminal, based on network load data transmitted by one or more network access points, or estimated interference based on interference measurements at the access terminal.

At 1114, method 1100 can submit an access probe to the preferred access point, utilizing the select set of access resources. Optionally, the access probe can include reserved DL resources, as specified above. AT 1116, method 1100 can monitor DL resources for a response to the access probe.

Optionally, the monitored DL resources can comprise any reserved DL resources specified in the access probe.

Figure 12:
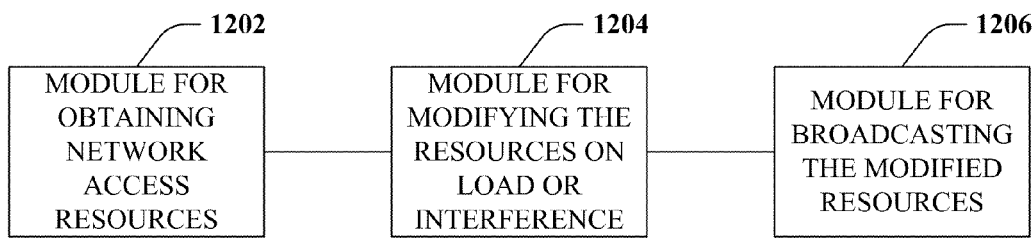
FIGS. 12 and 13 illustrate block diagrams of example systems for providing and facilitating, respectively, improved access resource allocation.
Figure 13:
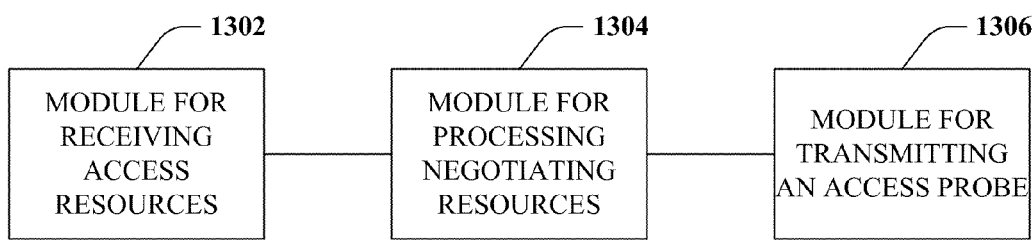

FIGS. 12 and 13 illustrate example systems 1200, 1300 for implementing re-use in wireless access communications and providing coordinated resource reservation, respectively, according to aspects of the subject disclosure. For example, systems 1200 and 1300 can reside at least partially within a wireless communication network and/or within a transmitter such as a node, base station, access point, user terminal, personal computer coupled with a mobile interface card, or the like. It is to be appreciated that systems 1200 and 1300 are represented as including functional blocks, which can be functional blocks that represent functions implemented by a processor, software, or combination thereof (e.g. firmware).

System 1200 comprises a module 1202 for obtaining network access resources from a network access point. The network access resources can comprise a general use channel for access probes within a wireless environment. Additionally, system 1200 can comprise a module 1204 for modifying the resources based on network load or network interference conditions. Modification can be based on an executed re-use algorithm that selects a subset of UL access channel resources for a particular network access point. Additionally, system 1200 can comprise a module for broadcasting the modified resources to access terminals in a wireless coverage area served by system 1200.

System 1300 can comprise a module 1302 for receiving UL access resources from a wireless network access point. Furthermore, system 1300 can comprise a module for negotiating reserved DL access resources from an access point neighboring or interfering with the network access point. Further to the above, system 1300 can comprise a module 1306 for including the reserved DL access resources in an access probe, and deliver the access probe to the wireless network access point on the received UL access resources.

Figure 14:
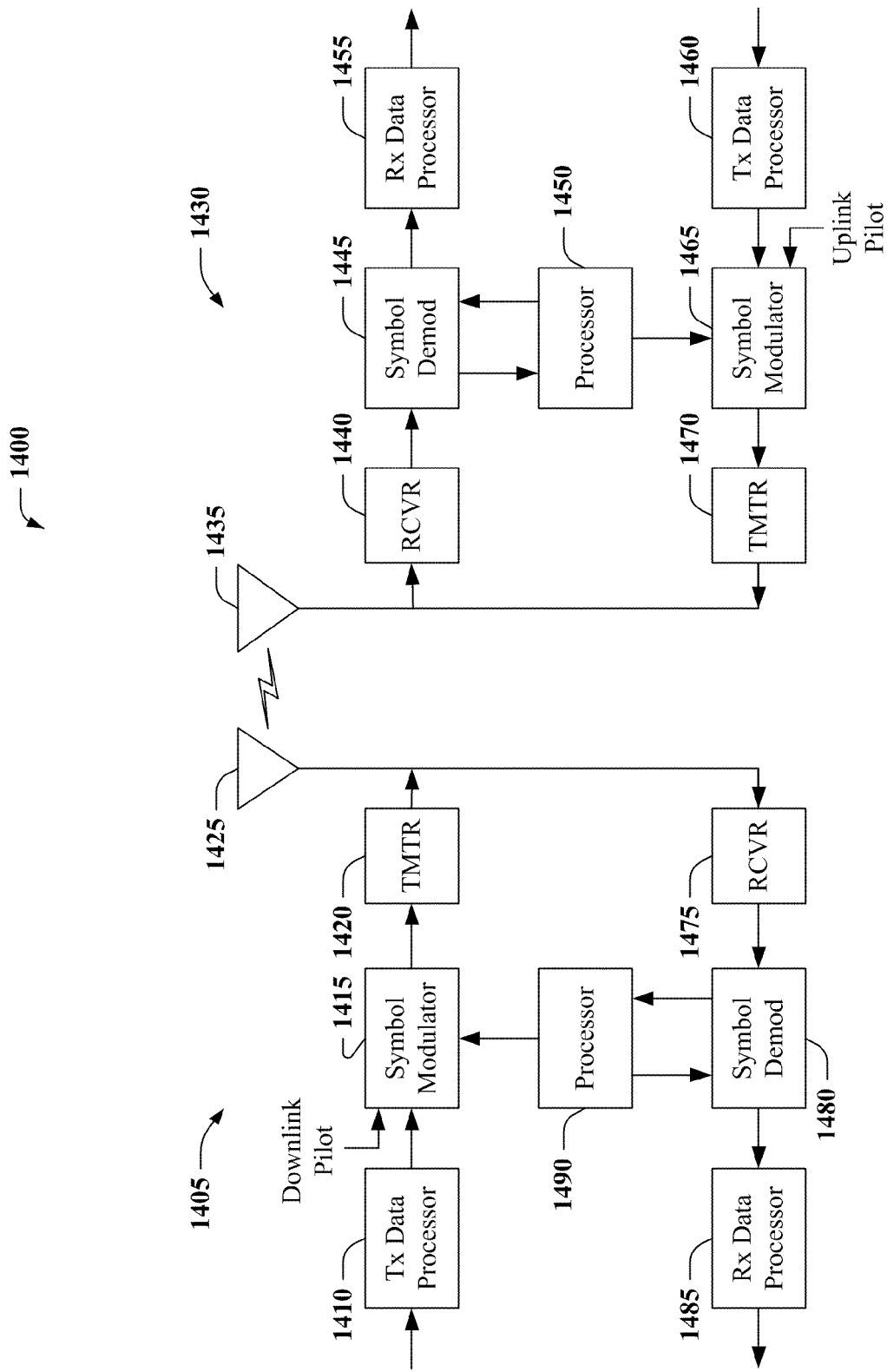
FIG. 14 depicts a block diagram of an example wireless transmit-receive chain facilitating wireless communication according to one or more aspects.

FIG. 14 depicts a block diagram of an example system 1400 that can facilitate wireless communication according to some aspects disclosed herein. On a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405. Specifically, the uplink signal can be in accordance with SC-FDMA requirements and can include frequency hopping mechanisms as described herein.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

Figure 15:
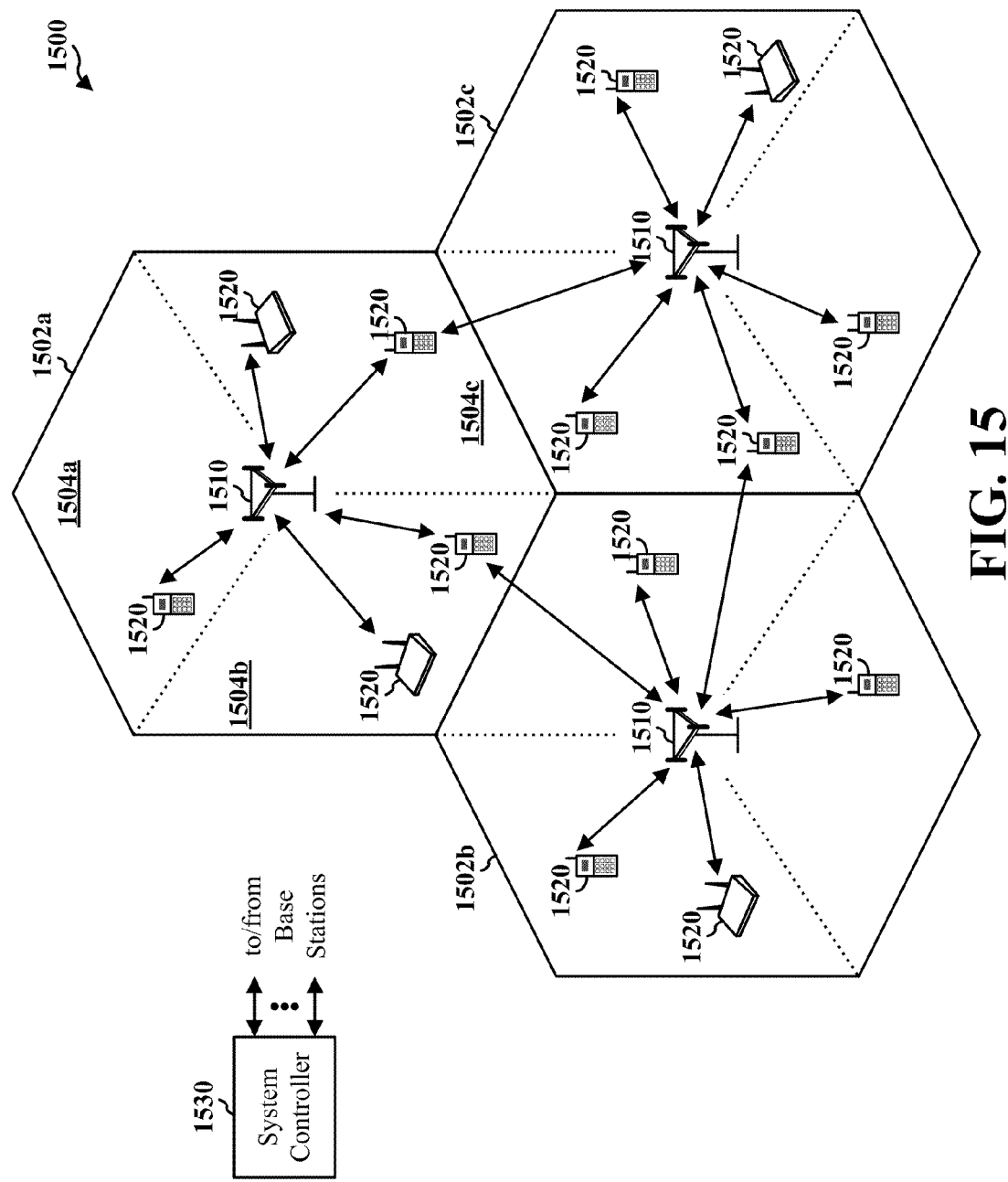
FIG. 15 depicts a block diagram of a sample cellular communication environment according to general aspects of the subject disclosure.

FIG. 15 illustrates a wireless communication system 1500 with multiple base stations (BSs) 1510 (e.g., wireless access points, wireless communication apparatus) and multiple terminals 1520 (e.g., ATs), such as can be utilized in conjunction with one or more aspects. A BS (1510) is generally a fixed station that communicates with the terminals and can also be called an access point, a Node B, or some other terminology. Each BS 1510 provides communication coverage for a particular geographic area or coverage area, illustrated as three geographic areas in FIG. 15, labeled 1502*a*, 1502*b*, and 1502*c*. The term "cell" can refer to a BS or its coverage area depending on the context in which the term is used. To improve system capacity, a BS geographic area/coverage area can be partitioned into multiple smaller areas (e.g., three smaller areas, according to cell 1502*a* in FIG. 15), 1504*a*, 1504*b*, and 1504*c*. Each smaller area (1504*a*, 1504*b*, 1504*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1520 are typically dispersed throughout the system, and each terminal 1520 can be fixed or mobile. Terminals 1520 can also be called a mobile station, user equipment, a user device, wireless communication apparatus, an access terminal, a user terminal or some other terminology. A terminal 1520 can be a wireless device, a cellular phone, a personal digital assistant (PDA), a wireless modem card, and so on. Each terminal 1520 can communicate with zero, one, or multiple BSs 1510 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1530 couples to base stations 1510 and provides coordination and control for BSs 1510. For a distributed architecture, BSs 1510 can communicate with one another as needed (e.g., by way of a wired or wireless backhaul network communicatively coupling the BSs 1510). Data transmission on the forward link often occurs from one access point to one access terminal at or near the maximum data rate that can be supported by the forward link or the communication system. Additional channels of the forward link (e.g. control channel) can be transmitted from multiple access points to one access terminal. Reverse link data communication can occur from one access terminal to one or more access points.

Figure 16:
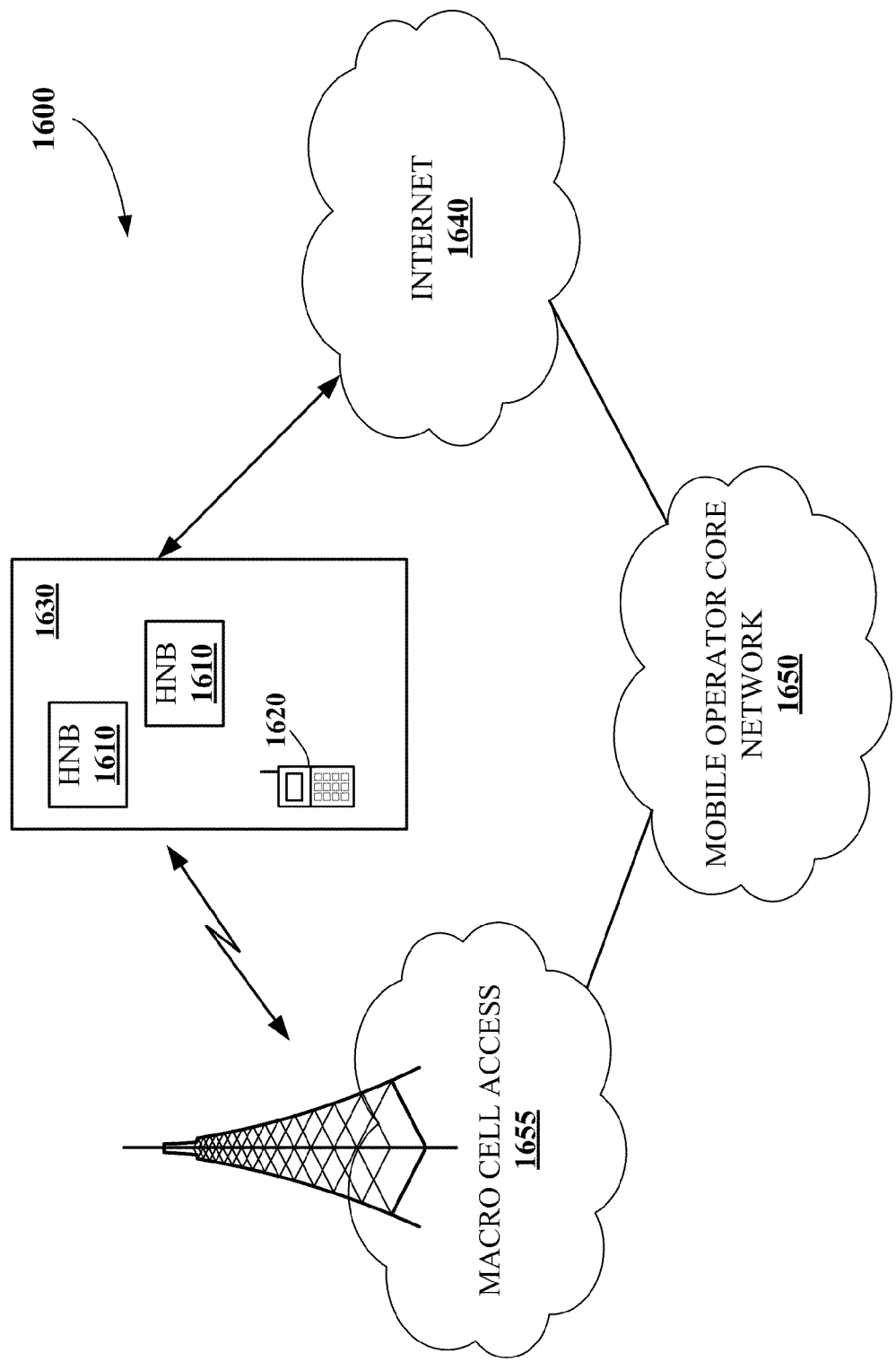
FIG. 16 illustrates a block diagram of an example system that enables semi or unplanned deployment of low power or restricted access base stations.

FIG. 16 illustrates an exemplary communication system enabling deployment of HNB base stations (Femto base stations) within a network environment. As shown in FIG. 16, the system 1600 includes multiple HNB units 1610. HNBs 1610 are each installed in a corresponding small area network environment 1630, e.g., a user residence or other user-controlled environment such as a small or home office. Further HNBs 1610 are configured to serve associated user equipment (UE) 1620. In some embodiments HNBs are further configured to serve alien UE. Each HNB 1610 is coupled to a public network 1640 and a mobile operator core network 1650 via a network link (not shown). Preferably the public network 1640 is the Internet. Exemplary network links include cable modems or DSL routers.

Although embodiments described herein use 3GPP terminology, one skilled in the art should understand that the embodiments may be applied to 3GPP2 technology (1xRTT, 1xEVDO R10, RevA, RevB) as well as 3GPP technology (Rel99, Rel5, Rel6, Rel7) and other related technologies. In embodiments described herein, preferably the owner of the HNB 1610 subscribes to mobile service, e.g. 3G mobile service, offered through the mobile operator core network 1650 and the UE 1620 is capable of operating both in a macro cellular environment and in residential small area network environment of which HNB 1610 is part. Thus the network environment of which HNB 1610 is part is backward compatible with existing UE 1620.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g. data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of facilitating access to a wireless communication environment comprising diverse types of wireless access points, comprising:
   obtaining a network load for the wireless communication environment relative to at least one load threshold;
   selecting a re-use algorithm based at least in part on the network load relative to the at least one load threshold, wherein the selecting comprises selecting between:
      a natural re-use algorithm when the current network load is below a minimum load threshold,
      a pseudo-random re-use algorithm when the current network load is above the minimum load threshold and below a maximum threshold, and
      a planned re-use algorithm and negotiation scheme when the current network load is above the maximum threshold;
   employing a processor to parse a set of wireless resources dedicated for access communication and to employ the selected re-use algorithm to generate a subset of the wireless resources reserved for a particular network access point if interference at the access point is above a minimum threshold; and
   outputting the generated subset to a wireless transmitter for broadcast transmission to facilitate terminal access to the particular network access point.

2. The method of claim 1, further comprising:
   receiving a network access request on the subset of the wireless resources; and
   extracting information from the access request indicative of at least one downlink (DL) wireless resource reserved for the particular network access point by an access point neighboring or causing interference to the particular access point.

3. The method of claim 2, further comprising employing the reserved DL wireless resource to transmit an access grant in response to the access request.

4. The method of claim 1, wherein generating the subset of the wireless resources further comprises selecting a sub-band or sub-slot of a wireless signal based at least in part on a measure of channel interference or network load.

5. The method of claim 1, wherein generating the subset of the wireless resources further comprises selecting a common time segment specified for network access points within a macro coverage area if network load within the coverage area is below a threshold level.

6. The method of claim 1, wherein generating the subset of the wireless resources further comprises random selection of a time sub-slot or frequency sub-band of the set of wireless resources.

7. The method of claim 1, wherein generating the subset of the wireless resources further comprises negotiating with a neighboring or interfering access point to secure the subset for the particular access point for a limited time.

8. The method of claim 7, wherein negotiating is based at least on quality of service (QoS) commitments of the particular network access point.

9. The method of claim 1, further comprising:
determining an access type or transmit power type of the particular access point; and
generating the subset of the wireless resources based at least in part on the access or transmit power type.

10. The method of claim 1, further comprising:
dynamically selecting the re-use algorithm based on uplink or downlink interference on the set of resources.

11. An apparatus that facilitates communication with a network, comprising:
memory that includes stored protocols that identify wireless signal resources for network access communication involving the apparatus;
a wireless transmitter for broadcasting a subset of wireless resources employed for access communication with the apparatus; and
a data processor that executes the following modules:
a re-use module that establishes a re-use scheme for access resource selection based at least on network load or interference conditions relative to at least one load threshold; and
a selection module that employs the re-use scheme to generate the subset of wireless resources from a set of network access resources, wherein the selection module selects between:
a natural re-use scheme when a network load measurement is below a minimum threshold,
a pseudo-random re-use scheme when the network load measurement is below an upper threshold and above a minimum threshold, and
a planned re-use scheme when the network load measurement is above an upper threshold.

12. The apparatus of claim 11, further comprising an interface module that obtains a measurement of the network load conditions from a high layer component of the network.

13. The apparatus of claim 11, further comprising a negotiation module that manages communication between the apparatus and a neighboring or interfering network access point to reduce interference on the subset of wireless resources if the re-use scheme is a planned re-use scheme.

14. The apparatus of claim 13, wherein the negotiation module requests the network access point to blank or employ reduced power on the subset of wireless resources.

15. The apparatus of claim 13, wherein the negotiation module conveys the request via a wired or wireless backhaul between the apparatus and the network access point.

16. The apparatus of claim 13, wherein the negotiation module obtains an over-the-air (OTA) message from an access terminal that specifies resources reserved by the network access point for the apparatus.

17. The apparatus of claim 11, further comprising a classification module that selects the set of network access resources from a superset of access resources based at least in part on a transmit power type or access type of the apparatus.

18. The apparatus of claim 11, further comprising a dynamic resource module that monitors changes in subsequent load or interference conditions and updates the re-use module with current conditions.

19. The apparatus of claim 18, wherein the re-use module changes the re-use scheme and the selection module generates a new subset of wireless resources based on the current conditions.

20. An apparatus for wireless communication, comprising:
means for employing a processor to obtain a set of wireless resources employed for access communication with a particular network access point;
means for employing the processor to employ a re-use algorithm to modify the set of wireless resources based on changes in network load or interference conditions, wherein the employed re-use algorithm is selected between:
a natural re-use algorithm when a current network load is below a minimum load threshold,
a pseudo-random re-use algorithm when the current network load is above the minimum load threshold and below a maximum threshold, and
a planned re-use algorithm and negotiation scheme when the current network load is above the maximum threshold;
and
means for employing a wireless transmitter to broadcast the set of wireless resources to facilitate terminal access to the particular network access point.

21. At least one processor configured for wireless communication, comprising:
a first module that parses a set of wireless resources dedicated for access communication;
a second module that employs a re-use algorithm to generate a subset of the wireless resources reserved at least for a particular network access point, wherein the second module selects between:
a natural re-use algorithm when a network load measurement is below a minimum threshold,
a pseudo-random re-use algorithm when the network load measurement is below an upper threshold and above a minimum threshold, and
a planned re-use algorithm when the network load measurement is above an upper threshold;
and
a third module that outputs the generated subset for broadcast transmission to facilitate terminal access to the particular network access point.

22. A computer program product, comprising:
a non-transitory computer-readable medium, comprising:
a set of codes for causing a computer to parse a set of wireless resources dedicated for access communication;
an additional set of codes for causing the computer to employ a re-use algorithm to generate a subset of the wireless resources reserved at least for a particular network access point, the employed re-use algorithm selected between:
a natural re-use algorithm when a current network load is below a minimum load threshold,
a pseudo-random re-use algorithm when the current network load is above the minimum load threshold and below a maximum threshold, and a planned re-use algorithm and negotiation scheme when the current network load is above the maximum threshold;
and
a further set of codes for causing the computer to output the generated subset for broadcast transmission to facilitate terminal access to the particular network access point.

23. A method of accessing a wireless network, comprising:
employing a wireless receiver to obtain a set of wireless signal access resources employed by a wireless network access point;
employing a data processor to select a subset of the wireless signal access resources for transmission of an access probe to the wireless network, wherein the selected subset are reserved by a second wireless network access point;
employing a resource re-use scheme for selection of the subset based at least in part on a network load, the re-use scheme selected between:
a natural re-use scheme when a network load measurement is below a minimum threshold,
a pseudo-random re-use scheme when the network load measurement is below an upper threshold and above a minimum threshold, and
a planned re-use scheme when the network load measurement is above an upper threshold;
and
employing a wireless transmitter to deliver the access probe to the wireless network access point.

24. The method of claim 23, wherein selecting the subset further comprises selecting a subset of signal access resources employed by a particular type of access point.

25. The method of claim 24, wherein the particular type of access point is a restricted association access point or a low power access point.

26. The method of claim 23, wherein selecting the subset further comprises employing a random function to select a time-frequency segment of the access resources.

27. The method of claim 23, further comprising specifying DL resources reserved by the second wireless network access point in the access probe.

28. The method of claim 23, further comprising obtaining an indication of DL interference at the wireless receiver and selecting the subset to mitigate the interference.

29. The method of claim 23, further comprising requesting an interfering access point to reduce power or blank signal resources on the selected subset of resources, wherein selection of the subset results from the interfering access point responding in agreement to the request.

30. The method of claim 29, further comprising forwarding the agreement to the request to the wireless network access point and obtaining a response from such access point indicating resources to select for the subset.

31. The method of claim 23, further comprising receiving an indication of current network load from the wireless network access point for selection of the subset.

32. An apparatus for wireless communication, comprising:
a wireless transceiver for sending and receiving wireless signals;
memory that stores network protocols for identifying access channels employed by network access points, the network protocols employing a re-use algorithm selected between:
a natural re-use algorithm when a current network load is below a minimum load threshold,
a pseudo-random re-use algorithm when the current network load is above the minimum load threshold and below a maximum threshold, and
a planned re-use algorithm and negotiation scheme when the current network load is above the maximum threshold;
and
a data processor configured to execute the following modules:
a preference module that monitors received downlink (DL) signals and identifies a preferred network access point from the signals;
an access module that employs the stored protocols to obtain access communication resources reserved by a non-preferred network access point for the preferred network access point;
a signaling module that generates an access probe to be transmitted by the wireless transceiver over the reserved resources.

33. The apparatus of claim 32, wherein the access module references the network protocols stored in memory to obtain the specified resources.

34. The apparatus of claim 32, wherein the access module analyzes a transmission from the preferred network access point identifying the specified resources.

35. The apparatus of claim 32, wherein the access module analyzes a transmission received from the non-preferred network access point identifying the specified resources.

36. The apparatus of claim 32, further comprising a measurement module that calculates interference on access channels employed by the network access points, wherein the specified resources are referenced at least in part based on the calculated interference.

37. The apparatus of claim 32, further comprising a mediation module that requests the non-preferred access point to reduce transmit power on the specified resources employed by the preferred network access point.

38. The apparatus of claim 37, wherein a response to the transmit power reduction request is conveyed to the preferred network access point to select DL access resources.

39. The apparatus of claim 38, wherein:
the wireless transceiver obtains a DL resource selection as a result of conveying the response to the transmit power reduction request; and
the wireless transceiver tunes to the selected DL resource to obtain an access grant/denial.

40. The apparatus of claim 32, wherein the stored protocols include a re-use protocol specifying particular access channel resources to be employed based on network load or interference conditions.

41. The apparatus of claim 40, wherein the re-use protocol instructs the access module to at least one of:
employ a common segment of an access channel for low network interference or load;
employ pseudo-random algorithm to select a subset of access channel resources for moderate network interference or load; and
request the preferred network access point to identify access resources based on negotiations with neighboring access points for high interference or load.

42. The apparatus of claim 41, wherein the apparatus provides wireless communication with the non-preferred access point to facilitate the negotiations.

43. An apparatus for accessing a wireless network, comprising:

means for employing a wireless receiver to obtain a set of wireless signal access resources employed by a wireless network access point;

means for employing a data processor to negotiate with a neighboring or interfering access point for reserved resources for access communication involving the wireless network access point, use of the reserved resources being allocated according to a re-use algorithm selected between:
- a natural re-use algorithm when a current network load is below a minimum load threshold,
- a pseudo-random re-use algorithm when the current network load is above the minimum load threshold and below a maximum threshold, and
- a planned re-use algorithm and negotiation scheme when the current network load is above the maximum threshold;

and means for employing a wireless transmitter to deliver an access probe and reserved resources to the wireless network access point.

44. At least one processor configured for wireless communication, comprising:

a first module that obtains a set of wireless signal access resources employed by a wireless network access point;

a second module that negotiates with a neighboring or interfering access point for reserved resources for access communication involving the wireless network access point, use of the reserved resources being allocated according to a re-use algorithm selected between:
- a natural re-use algorithm when a current network load is below a minimum load threshold,
- a pseudo-random re-use algorithm when the current network load is above the minimum load threshold and below a maximum threshold, and
- a planned re-use algorithm and negotiation scheme when the current network load is above the maximum threshold;

and a third module that delivers an access probe to the wireless network access point.

45. A computer program product, comprising:

a non-transitory computer-readable medium, comprising:

a set of codes for causing a computer to obtain a set of wireless signal access resources employed by a wireless network access point;

an additional set of codes for causing the computer to negotiate with a neighboring or interfering access point for reserved resources for access communication involving the wireless network access point, use of the reserved resources being allocated according to a re-use algorithm selected between:
- a natural re-use algorithm when a current network load is below a minimum load threshold,
- a pseudo-random re-use algorithm when the current network load is above the minimum load threshold and below a maximum threshold, and
- a planned re-use algorithm and negotiation scheme when the current network load is above the maximum threshold;

and a further set of codes for causing the computer to deliver an access probe to the wireless network access point.

* * * * *